(12) United States Patent
Palm

(10) Patent No.: US 8,635,845 B1
(45) Date of Patent: Jan. 28, 2014

(54) ROTARY BRUSH HARVESTERS AND METHODS OF USING THE SAME

(71) Applicant: Ryan S. Palm, Kingsburg, CA (US)

(72) Inventor: Ryan S. Palm, Kingsburg, CA (US)

( * ) Notice: Subject to any disclaimer, the term of this patent is extended or adjusted under 35 U.S.C. 154(b) by 0 days.

(21) Appl. No.: 13/786,194

(22) Filed: Mar. 5, 2013

Related U.S. Application Data

(63) Continuation of application No. 13/786,141, filed on Mar. 5, 2013.

(51) Int. Cl.
*A01D 46/00* (2006.01)

(52) U.S. Cl.
USPC .......................................... 56/328.1; 56/330

(58) Field of Classification Search
USPC .................... 56/328.1, 330, 340.1
See application file for complete search history.

(56) References Cited

U.S. PATENT DOCUMENTS

| | | | |
|---|---|---|---|
| 3,261,152 A | | 7/1966 | Johnson et al. |
| 3,325,984 A | * | 6/1967 | Christie et al. .................. 56/330 |
| 3,490,217 A | | 1/1970 | Olmo et al. |
| 3,531,925 A | | 10/1970 | Vines et al. |
| 3,561,205 A | | 2/1971 | Baker |
| 3,613,339 A | | 10/1971 | Riggs |
| 3,621,643 A | | 11/1971 | Gerrans |
| 4,163,356 A | | 8/1979 | Robbins et al. |
| 4,257,217 A | * | 3/1981 | McClendon ................. 56/327.1 |
| 4,329,836 A | | 5/1982 | Scudder |
| 4,341,062 A | | 7/1982 | Scudder |
| 4,383,400 A | | 5/1983 | Mead et al. |
| 4,488,396 A | | 12/1984 | Fandrich |
| 4,508,062 A | * | 4/1985 | Berry et al. ..................... 119/846 |
| 4,750,322 A | | 6/1988 | Korthuis |
| 4,860,529 A | | 8/1989 | Peterson et al. |
| 4,976,094 A | * | 12/1990 | Williamson et al. ............ 56/330 |
| 5,027,593 A | | 7/1991 | Korthuis et al. |
| 5,101,618 A | | 4/1992 | Oldridge |
| 5,287,687 A | * | 2/1994 | Urich et al. .................. 56/327.1 |
| 5,339,612 A | * | 8/1994 | Scott ............................... 56/330 |
| 5,355,667 A | | 10/1994 | Scott |
| 5,495,708 A | | 3/1996 | Scott et al. |
| 5,660,033 A | | 8/1997 | Korthuis et al. |

(Continued)

FOREIGN PATENT DOCUMENTS

| | | |
|---|---|---|
| EP | 1842416 A1 | 4/2007 |
| ES | 2135315 A | 10/1996 |

(Continued)

OTHER PUBLICATIONS

Declaration of Ryan S. Palm, Jun. 10, 2013.

(Continued)

*Primary Examiner* — Alicia Torres
(74) *Attorney, Agent, or Firm* — Marcus N. DiBuduo; William K. Nelson

(57) ABSTRACT

Automated rotary brush harvesters that reduce or prevent damage to fruit or other crops ("produce") when they are removed from trees or bushes, and methods of using such harvesters are disclosed. The harvesters may include a brush having flexible radiating members (e.g., filaments or bristles) for removing crops from trees or bushes and a conveyor paired therewith for receiving the produce from the brush. The brush and conveyor may be angled to aid in collecting the produce and preventing damage to the produce. The conveyor may be configured to deliver the produce to one or more bins, which may be mounted on a bin elevator system.

30 Claims, 14 Drawing Sheets

(56) References Cited

U.S. PATENT DOCUMENTS

| | | | |
|---|---|---|---|
| 5,661,963 A | 9/1997 | Scott | |
| 5,904,034 A | 5/1999 | Youman et al. | |
| 5,946,896 A | 9/1999 | Daniels | |
| 6,003,293 A * | 12/1999 | Boese | 56/327.1 |
| 6,012,276 A | 1/2000 | Walker et al. | |
| 6,058,690 A | 5/2000 | Rutt et al. | |
| 6,178,730 B1 | 1/2001 | Visser | |
| 6,360,518 B1 | 3/2002 | Scott et al. | |
| 6,374,538 B1 | 4/2002 | Morris et al. | |
| 6,378,282 B1 | 4/2002 | Carlton | |
| 6,484,487 B1 | 11/2002 | Buist et al. | |
| 6,557,335 B2 | 5/2003 | Amaro et al. | |
| 6,865,872 B2 | 3/2005 | Youman et al. | |
| 6,931,829 B2 | 8/2005 | Zehavi et al. | |
| 7,069,713 B2 | 7/2006 | Marakis | |
| 7,082,744 B2 | 8/2006 | Briesemeister et al. | |
| 7,083,039 B2 | 8/2006 | Schloesser | |
| 7,117,661 B2 | 10/2006 | Chiel et al. | |
| 7,536,848 B2 | 5/2009 | Briesemeister et al. | |
| 2005/0034441 A1 | 2/2005 | Porta et al. | |
| 2008/0236127 A1 | 10/2008 | Couture | |
| 2011/0022231 A1 | 1/2011 | Walker et al. | |

FOREIGN PATENT DOCUMENTS

| | | |
|---|---|---|
| FR | 1379506 A | 1/1964 |
| GB | 1291822 A | 7/1968 |
| GB | 2063634 A | 11/1979 |
| WO | 2005043978 A1 | 10/2003 |
| WO | 2006103492 A1 | 5/2005 |
| WO | 2006103554 A1 | 3/2006 |
| WO | 2012104877 A1 | 1/2011 |

OTHER PUBLICATIONS

Toskas, A., Device for picking olives, English Abstract of European Patent Publication EP1842416, Oct. 10, 2007, European Patent Organization, http://www.epo.org/searching/free/espacenet.html.

Scott, P.R., Machine for harvesting citrus fruits, English Abstract of Spanish Patent Publication ES2135315, Oct. 16, 1999, European Patent Organization, http://www.epo.org/searching/free/espacenet.html.

Oxbo International Corporation, Brochure for Oxbo 9200 Coffee Harvester, available online at http://oxbocorp.com/Products/Coffee.aspx.

Oxbo International Corporation, Brochure for Oxbo 6420 Olive Harvester, available online at http://oxbocorp.com/Products/Olives.aspx.

Oxbo International Corporation, Brochure for Oxbo 9120 Rasberry Harvester, available online at http://oxbocorp.com/Products/Berries/RaspberryHarvesters/9120.aspx.

* cited by examiner

ROTARY BRUSH HARVESTERS AND METHODS OF USING THE SAME

CROSS-REFERENCE TO RELATED APPLICATIONS

This application is a continuation of U.S. patent application Ser. No. 13/786,141, filed on Mar. 5, 2013, hereby incorporated by reference in its entirety.

FIELD OF THE INVENTION

The present invention relates to harvesting apparatus having a rotating brush for removing fruit and other crops ("produce") from trees or bushes, and methods of using the same. The present application discloses single and dual-sided harvesting apparatuses for harvesting rows of espaliered or trellised trees or bushes, and methods of using the same. Additionally, the present invention relates to agricultural systems including the espaliered or trellised trees and the rotary brush harvesters.

DISCUSSION OF THE BACKGROUND

Conventional harvesting machines have been used with limited success to harvest certain types of fruit (e.g., stone fruit, such as peaches, nectarines, plums, etc.). For example, mechanical shakers have been used to harvest various crops (e.g., citrus, olives, etc.), and operate by grabbing the tree and shaking it until the fruit falls from the tree to a catch frame placed below the tree. Some of the fruit on the tree may fall several feet, resulting in bruising and wounds to the fruit. For instance, tree fruit (e.g., stone fruit) are grown a substantial distance above the ground and would fall several feet when knocked off of the tree. Such mechanical shakers have been used extensively in the agricultural industry for decades.

Some conventional row harvesters utilize spindles having rigid radiating arms, the spindles of which oscillate to remove fruit by shaking action. However, because the arms are rigid, active rotation of the spindles may cause drag and tree damage as the harvester moves along the trees. Thus, the spindles of conventional harvesters of this type are passively—not actively—rotated. An example of a conventional row harvester having passive spindles is described in U.S. Pat. No. 6,484,487. The passively rotating arms of these machines knock fruit off of trees or bushes as the harvester moves along the row and the spindle arms contact the tree or bush limbs and the fruit. The fruit then falls to a collection area (e.g., a catch frame) below the spindle arms. Like the mechanical shakers, the row harvesters cause fruit to fall a substantial distance (e.g., 3 to 15 feet), which can bruise and wound the fruit.

Certain fruits (e.g., stone fruit) are still primarily harvested by hand because of the risk that the fruit will be bruised by automated row harvesters or shakers. Crops that are harvested by hand are very expensive to farm. In the case of cannery peaches the cost of production is so high that acres are declining and product is coming from overseas where labor is cheaper. It is estimated that seventy percent of the aforementioned costs are hand labor, thus any invention to reduce labor would be of value to the farmer and would preserve production. Thus, there is a need for an automated harvesting system that can harvest tree fruit such that they are protected from long falls and bruising during harvesting.

SUMMARY OF THE INVENTION

The present invention concerns rotary brush harvesters that catch fruit or other crops as they are removed from a tree or bush by the harvester. The rotary harvesters described herein may prevent fruit and other crops ("produce") from falling substantial distances when they are removed from their trees or bushes, which would cause bruising and wounds to the crops. The present invention also concerns methods of using such rotary brush harvesters. The rotary brush harvesters and methods described herein prevent or reduce bruising and wounding of harvested crops and allow for selective harvesting of ripe crops.

Unlike conventional harvesting machines, the presently disclosed brush harvesters include one or more pairs of angled brushes and conveyors that together allow an entire row of trees or bushes to be harvested in one pass while preventing the harvested produce from dropping long distances from trees or bushes. The brushes are actively rotated to remove, or "pick", the harvested produce from the trees or bushes. The active rotation of the brushes of the present invention are distinct from conventional row harvesters which have rigid radiating arms that passively rotate as a result of contact with the trees or bushes. The brushes of the present invention have soft radiating members (e.g., bristles) that allow the brushes to be actively rotated into the trees or bushes to remove the produce therefrom as the brush harvester moves down a row of the trees or bushes, without the brushes causing damage to the produce as it is harvested. It is the rotary action of the brushes that removes the produce from the trees, rather than the collision of rigid radiating arms with the produce (as is the case with conventional row harvesters). The active rotation of the brush also draws the produce over the brush and then drops it on a conveyor that may be parallel to and closely paired with the brush.

In some embodiments, the brush and conveyor are arranged substantially parallel to one another and in close proximity. Such an arrangement allows the harvested produce (e.g., stone fruit) to be collected without falling long distances or sustaining damage. The paired brush and conveyor can be positioned at various angles relative to the ground and/or the row of trees or bushes to accommodate different crop arrangements (e.g., trellising, espaliered trees or bushes, a "V" row arrangement or "perpendicular V", etc.). However, it is preferable that the angle of the brush allows the produce to be caught on the conveyor and then delivered to a collection receptacle without sustaining bruising or wounds. Thus, both the parallel angled brushes and conveyors, and the relatively soft brushes contribute to a high yield of undamaged, ripe crops.

The capability of the rotary brush harvester to catch the harvested produce as it is removed from trees or bushes, thereby preventing them from falling substantial distances, is particularly important with respect to stone fruit (e.g., peaches, nectarines, plums, apricots, etc.) and some other tree fruit (e.g., apples, pears, citrus, etc.). Stone fruit and some other tree fruit cannot be effectively harvested with shakers and other conventional harvesting devices because the fruit are damaged when they fall from the tree to the ground. The presently disclosed rotary brush harvesters are able to automate harvesting of stone fruit and other produce while preventing or reducing damage to the produce.

As previously mentioned, the presently disclosed rotary brush harvesters are also able to selectively harvest produce based on maturity. More specifically, the harvesters include one or more rotating harvesting brushes having soft radiating members that are able to remove ripe produce, while leaving unripe produce on the tree or bush. This is important, since not all of the produce on a given plant or in a given field ripen simultaneously. For example, most stone fruit is harvested at least two times, to accommodate variance in the ripening process of the fruit. The fruit at the top of the tree tend to ripen faster than the fruit near the bottom. Harvesting unripe fruit is undesirable because stone fruit generally do not ripen well after being picked. The relatively soft brush fibers of the presently disclosed rotary brush harvesters can remove the looser, riper fruit, while leaving unripe fruit in the tree or bush.

The presently disclosed harvesters are particularly useful and effective in combination with a system of espaliered or trellised fruit trees or bushes that provide a substantial vertical tree-wall, in which the fruit bearing limbs are located in a relatively narrow wall that can be easily accessed by rotary brush harvester. When the trees or bushes are so arranged, the rotary brush harvester can efficiently capture the produce from the tree-wall without having to make substantial adjustments to angle or position of the one or more harvesting brushes.

In some embodiments, the present invention relates to apparatuses for harvesting produce from espaliered trees that includes a rotating brush having a generally elongate cylindrical shape for removing produce from the trees, a motor connected to the rotating brush and operable to actively rotate the brush, a conveyor running about parallel to the rotating brush for receiving the produce from the rotating brush, and a plurality of receptacles for receiving the produce from the conveyor. The rotating brush may include flexible radiating members (e.g., bristles, filaments, fibers, pegs, etc.). The longitudinal axis of the rotating brush may be at angle in a range from about 20° to about 70° (e.g., about 45°) relative to the ground, within a vertical plane that is parallel to a direction of travel of the harvesting apparatus. The apparatus for harvesting fruit may further include a second rotating brush on the same side of the apparatus as the first rotating brush and located below the first rotating brush, allowing the apparatus to harvest produce from two different areas (a top and a bottom) of the espaliered trees at different rotational speeds, at different depths in the trees, or with brushes having different characteristics (e.g., flexibility, bristle length, etc.).

Embodiments of the present invention also relate to harvesting apparatuses for removing produce from espaliered trees that include a mobile chassis, a first harvesting brush and a second harvesting brush, each harvesting brush having a substantially elongate cylindrical shape, where the first and second harvesting brushes are mounted on the chassis about parallel to each other on opposite sides of the chassis, at least one motor operable to actively rotate the harvesting brushes, a first conveyor and a second conveyor, the first conveyor about parallel to the first harvesting brush and the second conveyor about parallel to the second harvesting brush, and at least one collection receptacle near an end of at least one of the first and second conveyors for receiving harvested produce. The harvesting apparatus may be a row harvester having a tunnel running down the middle of the chassis, through which a row of trees or bushes can be passed. Additionally, the first and second harvesting brushes may be mounted on opposite sides of the tunnel, and may be operable to rotate the medial edges of the first and second brushes (the edges engaged with the row of trees or bushes) upward into the row of trees or bushes. The first and second brushes may each include flexible radiating members (e.g., bristles, filaments, fibers, pegs, etc.). The longitudinal axes of the first and second harvesting brushes may be at angle in a range from about 20° to about 70° (e.g., about 45°) relative to the ground, within a vertical plane that is parallel to a direction of travel of the harvesting apparatus. Additional aspects of such embodiments are further explained below.

Some embodiments of the present invention relate to a harvesting apparatus for harvesting produce from trees that includes a chassis operable to travel in a horizontal direction, a first rotating brush having a substantially elongate cylindrical shape for harvesting the produce, the first brush mounted on the chassis, a motor operable to actively rotate the first brush at variable rotational speeds, a first conveyor running about parallel to the first brush, and a first receptacle for receiving harvested produce from the first conveyor. The rotating brush may include flexible radiating members (e.g., bristles, filaments, fibers, pegs, etc.). The apparatus for harvesting fruit may further include a second rotating brush on an opposite side of the chassis from the first rotating brush, allowing the harvesting apparatus to harvest produce from two separate rows of espaliered trees at the same time. The longitudinal axes of the first and second harvesting brushes may be at angle in a range from about 20° to about 70° (e.g., about 45°) relative to the ground, within a vertical plane that is parallel to a direction of travel of the harvesting apparatus.

Some embodiments of the present invention relate to harvesting apparatuses for removing produce from trees (e.g., espaliered or trellised trees) that include a mobile chassis having a tunnel therein for passing the trees; a first harvesting brush and a second harvesting brush, each harvesting brush having a substantially elongate cylindrical shape and flexible radiating members, mounted on the chassis about parallel to each other and on opposite sides of the tunnel, and the first and second harvesting brushes each having a downward pitch angle of about 20° to about 70° relative to the ground; at least one motor operable to actively rotate the first and second harvesting brushes, the first and second harvesting brushes each have a medial side that protrudes into the tunnel and the at least one motor is operable to rotate the medial sides of the first and second harvesting brushes upward into the trees passing through the tunnel; a first conveyor and a second conveyor, the first conveyor being about parallel to the first harvesting brush and the second conveyor about parallel to the second harvesting brush, where a distance between a lateral side of the first harvesting brush and the first conveyor is less than about 1 foot and the first conveyor is at or below a longitudinal axis of the first harvesting brush in a vertical dimension, and a distance between a lateral side of the second harvesting brush and the second conveyor is less than about 1 foot and the second conveyor is at or below a longitudinal axis of the second harvesting brush in a vertical dimension; a third conveyor operable to move the produce from the second conveyor across the chassis; and at least one collection receptacle near an end of the first conveyor for receiving the produce from the first conveyor and the second conveyor.

Still some embodiments of the present invention relate to methods of harvesting crops that include inserting a harvesting brush having a generally elongate cylindrical shape into the trees, actively rotating the harvesting brush while engaging the brush with one of the trees, such that the brush removes the produce from the tree, catching the produce removed from the trees on a conveyor that runs about parallel to a rotational axis of the harvesting brush; and collecting the produce in a receptacle at a position near an end of the conveyor. The rotating brush may include flexible radiating members (e.g., bristles, filaments, fibers, pegs, etc.), and may be actively rotated by a motor. The method may further include the step of inserting a second harvesting brush having a generally elongate cylindrical shape into one of the trees. The first and the second harvesting brushes may have a rotational axis having an angle of between about 20° and about 70° relative to the ground. The rotational axis of the harvesting brushes may be the same, or they may be different. The second harvesting brush may be on an opposite side of the trees from the first harvesting brush. Alternatively, the first harvesting brush may be engaged with a tree in a first row of trees, and the second harvesting brush may be engaged with a tree in a second row of trees.

Some embodiments of the present invention include methods of harvesting produce from a row of espaliered trees that comprise moving a harvesting apparatus in a horizontal direction along the row of trees, the harvesting apparatus having at least one harvesting brush, inserting the at least one harvesting brush into the row of trees, actively rotating the at least one harvesting brush to remove produce from the trees and projecting the produce towards at least one conveyor running parallel to the at least one harvesting brush, catching the produce on the at least one conveyor, transporting the produce upwards along the conveyor, and depositing the produce from the conveyor into at least one receptacle. The at least one harvesting brush may comprise two or more harvesting brushes, each having an axis of rotation of between about 20° and about 70° relative to the ground. At least two of the two or more harvesting brushes may have a conveyor parallel thereto, on which the harvesting brush deposits the produce. The harvesting brushes may have flexible radiating members. The side of each of the two or more harvesting brushes that is engaged with the espaliered trees may rotate upward into the trees, drawing the produce over the two or more brushes, and depositing the produce on a corresponding conveyor.

Some embodiments of the present invention relate to a system that includes an ordered arrangement of a plurality of rows of fruit trees running parallel to each other and spaced apart by a predetermined distance, and a row harvester operable to move along the plurality of rows of fruit trees in a direction parallel to the rows, the row harvester having a tunnel running through the row harvester for passing a row of fruit trees, and a first cylindrical harvesting brush and a second cylindrical harvesting brush, the first and second harvesting brushes located on opposite sides of the tunnel, both the first and second harvesting brushes behaving downward pitch angles of 20° to 70° relative to the direction in a vertical plane parallel to the direction. The plurality of rows of fruit trees may be arranged in a fruiting wall system or a trellis system.

The above-described objects, advantages and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

DETAILED DESCRIPTION OF THE EXEMPLARY EMBODIMENTS

Figure 1:
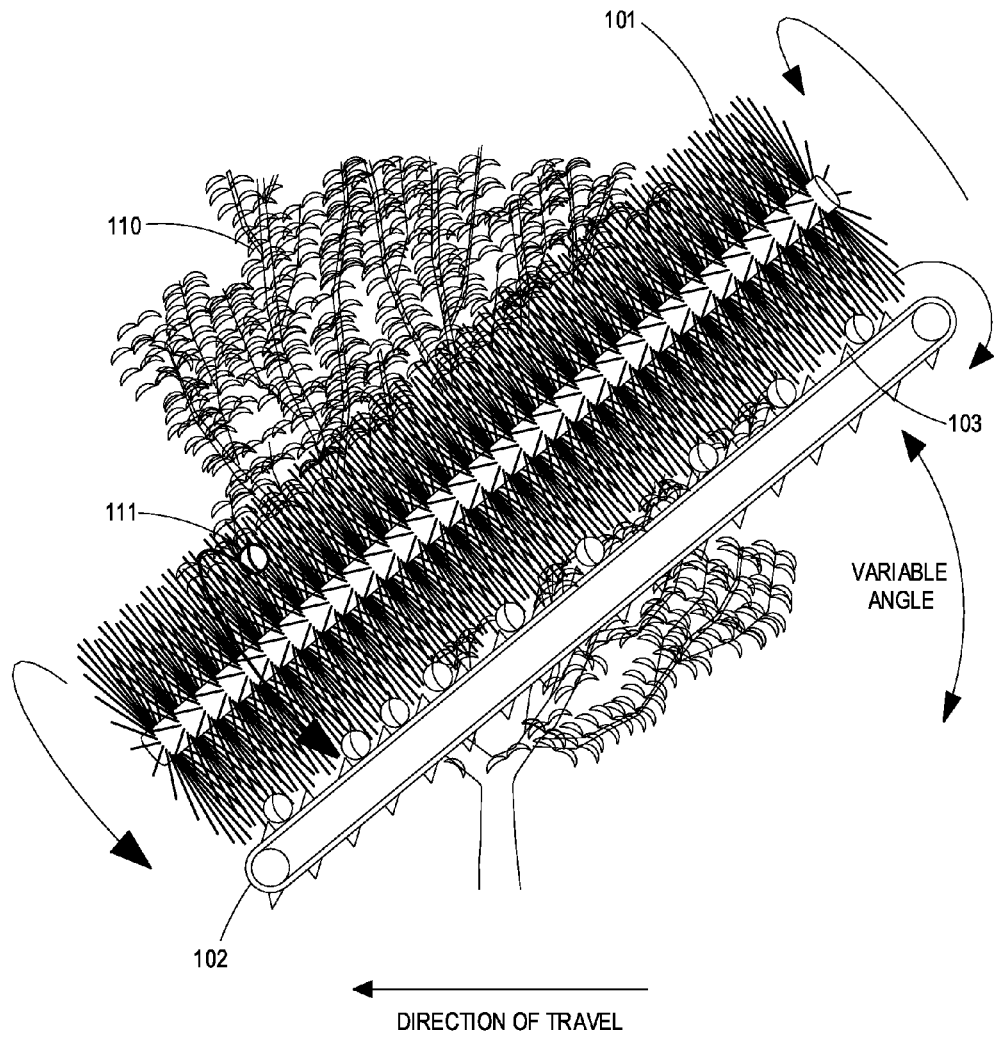
FIG. 1 shows a side view of an exemplary paired rotary harvesting brush and conveyor according to some embodiments of the present invention, in which the rotary harvesting brush is engaged with a tree.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without these specific details.

The present application includes the terms "pitch" and "yaw" (and grammatical variations thereof) regarding the orientation of certain components of the harvesting apparatus described below. These terms are used in a way that is analogous to how they are used in aviation, in order to simplify the description of the invention. Pitch is typically used to refer to an angle of rotation on a horizontal, lateral axis, and describes the vertical angle of the front with respect to the direction of travel. Pitch is used in a similar manner herein, specifying the angle of a front end of a cylindrical rotating brush (the end nearer the front of the rotary brush harvester) in a vertical plane that is parallel to the horizontal direction of travel of the rotary brush harvester. Yaw typically refers to an angle of rotation on a vertical axis (perpendicular to the pitch axis), and describes the side to side rotation of the front on a horizontal plane. Yaw is used in a similar manner herein, specifying the angle of the front end of the cylindrical rotating brush in a horizontal plane. The term "medial" means situated at or near a midline of a structure (when viewing a front of the structure), the term "lateral" means situated away from a midline of a structure and near or at outer edge, the term "proximal" means nearest or closest, and the term "distal" means furthest, however these terms are also given their ordinary meaning.

The present invention concerns rotary brush harvesters and methods of using the same. Such rotary brush harvesters may have one or more brushes on one side of the harvester for harvesting produce from one side of a row of trees or bushes. In some embodiments, the rotary brush harvesters may have brushes on opposing sides of a chassis allowing the rotary brush harvester to harvest produce from either side of a row of trees or bushes. In some embodiments, the rotary brush harvesters may have brushes on opposing, lateral sides of a chassis allowing the rotary brush harvester to harvest produce from two adjacent rows of trees or bushes as the harvester passes between the adjacent rows. The present invention also concerns methods of harvesting produce using a rotary brush harvester, from one or both sides of a row of trees or bushes or from sides of adjacent rows of trees or bushes.

The presently disclosed rotary brush harvesters can be employed to harvest fruit and other crops ("produce") from various crop growing systems. In some embodiments, the rotary brush harvester may be configured to harvest produce from an espaliered or trellised orchard system that provides a substantially vertical tree-wall, in which a perimeter of a row of trees or bushes has a substantially vertical arrangement of horizontal fruit-bearing limbs having about the same length (see, e.g., tree 210 in FIG. 2). In some embodiments, the rotary brush harvester may be configured to harvest produce from a "V" orchard system ("perpendicular V" system), in which the trees are manipulated to grow in a v-like shape, with limbs protruding outward from the trees on both sides of a row (see, e.g., tree 310 in FIG. 3). In some embodiments, the rotary brush harvester may be configured to harvest produce from trees or bushes in a simple row orchard. The trees in the various crop growing systems mentioned above may be grown with regular intervals between the parallel rows of trees or bushes such that the intervals are sized to accommodate the rotary brush harvester. Thus, the crop growing system allows for the rotary brush harvester to pass freely between the parallel rows of trees or bushes, thereby providing access to the trees or bushes.

The rotary brush harvesters of the present invention include one or more rotating harvesting brushes. The brushes are actively rotated to remove the produce from the trees. For example, each brush may be individually rotated by a motor. In some embodiments, multiple brushes may be rotated by the same motor. In other embodiments, each brush may be rotated by a separate motor. Each brush may rotate a constant or nearly constant speed, or may rotate at a variable speed. In some embodiments, the one or more brushes may rotate at the same speed. However, in other embodiments, the one or more brushes may rotate at different speeds. For example, and without limitation, the rotary brush harvester may have multiple brushes, each having different diameters. In such embodiments, the brush or brushes having bigger diameters (e.g., having longer bristles) may be rotated at a lower rotational speed in order to have a linear speed at an edge of the brush that is equal to or similar to a linear speed at an edge of the brush or brushes having smaller diameters. In some embodiments of the rotary brush harvester, the individual rotational speeds of the one or more rotating brushes may be tailored to accommodate the diameter of the brush, the particular produce to be harvested (e.g., slower rotational speeds may be used for softer types of fruit), the ripeness of the produce (e.g., slower rotational speeds may be used for riper produce), and other considerations.

In some embodiments, the rotary brush harvester may have a rotating brush that is positioned at a pitch angle in a range from about 20° to about 70° (e.g., about 30° to about 60°, about 40° to about 60°, about 45°, or any value or range of values therein) relative to its direction of travel (e.g., parallel to a row of trees or bushes). The rotating brush may also be paired with a conveyor that is parallel to and in close proximity to the brush. As an example and without limiting the invention, FIG. 1 shows a rotating harvesting brush 101 that may be positioned at a pitch angle of about 45° relative to its direction of travel, and may be paired with a parallel conveyor 102 in close proximity to the brush 101. The rotating harvesting brush is operable to spin the side of the brush that is engaged with the tree or bush upward into the limbs of the trees or bushes such that the produce is drawn up and over the brush and deposited on the associated conveyor. As an example and without limiting the invention, the curved arrows shown in FIG. 1 indicate that the brush 101 spins up into to tree 110 such that produce 111 is removed from the tree 110 by the active rotation of brush 101 and is drawn up and over the brush 101 and deposited on the conveyor 102. The pitch angle of the brush (e.g., brush 101) and the proximate conveyor (e.g., conveyor 102) for catching the produce (e.g., produce 111) removed from the trees or bushes by the brush combine to prevent the harvested produce from sustaining damage due to falls or contact with the harvesting mechanism (i.e., the brush and conveyor). The pitch of the brush prevents the fruit or other harvested crops from falling a substantial distance or straight down onto the ground or a collection area, which may result in bruising or wounds to the produce. Some embodiments of the present invention have a pitched brush that can deposit the produce on the closely paired conveyor that may have cleats, ridges, pegs, or other means to prevent the produce from rolling or falling. For example and without limiting the invention, FIG. 1 shows a conveyor 102 that may have cleats 103 for preventing produce 111 from rolling down the conveyor 102. However, in some embodiments, of the present invention, the conveyor may have a slide and deceleration or slowing elements that enable the produce to slowly roll down the conveyor. Thus, the produce may experience a very small drop from the brush to the conveyor and damage to the produce may be reduced or prevented.

Figure 2:
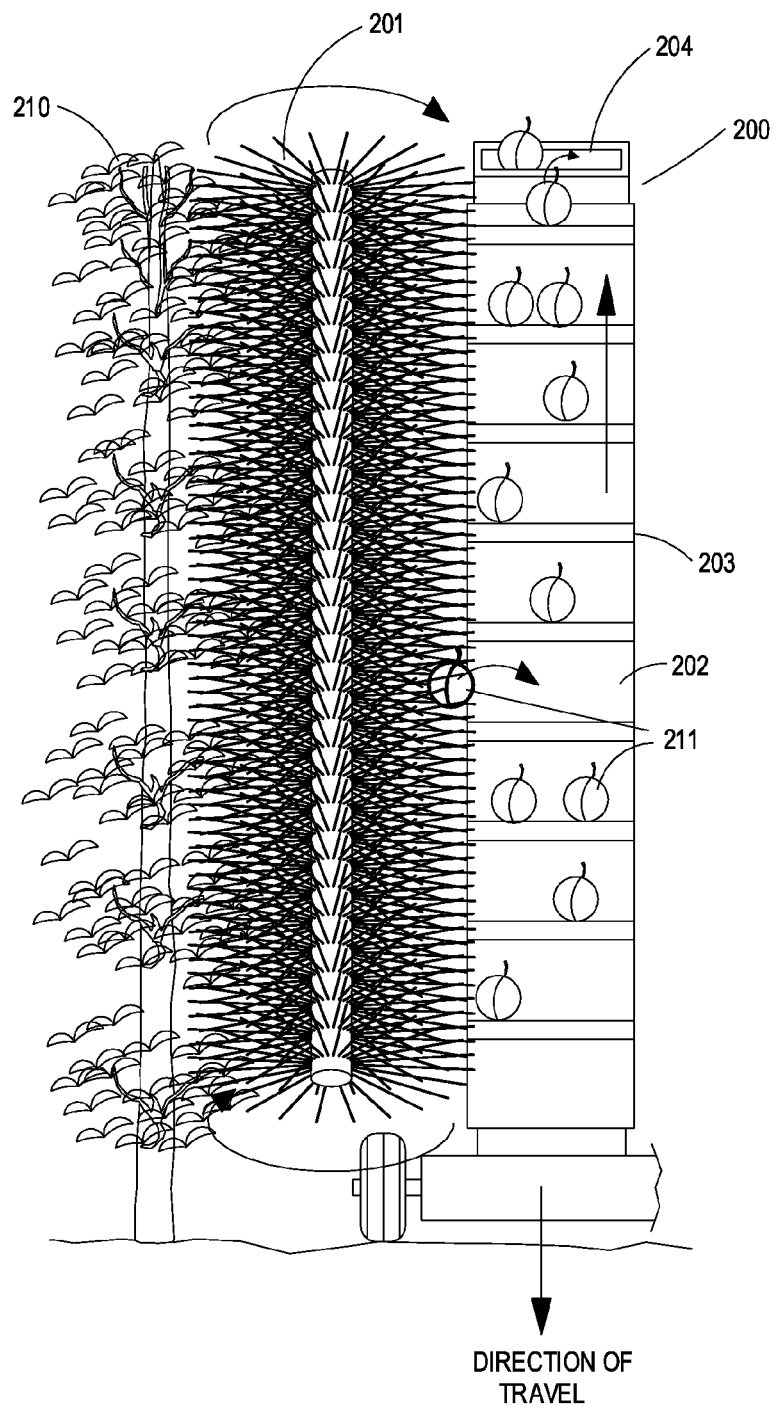
FIG. 2 shows a frontal view of an exemplary paired rotary harvesting brush and conveyor according to some embodiments of the present invention, in which the rotary brush is engaged with the tree.

The rotating brushes of the rotary brush harvester may be inserted into an outer portion of a tree-wall or row of trees or bushes, in order to remove fruit therefrom. The rotating brushes may be inserted sufficient distance into the trees or bushes to access the produce. As an example and without limiting the invention, the rotating brushes may be inserted about 4 inches to about 40 inches into the trees or bushes (e.g., about 6 inches to about 24 inches, about 12 inches to about 18 inches, about 18 inches, or any value or range of values therein). In some embodiments, the entire diameter or nearly the entire diameter of the brush may be inserted into the trees or bushes. As an example and without limiting the invention, FIG. 2 shows a rotating brush 201 inserted into the outer portion of the tree-wall of espaliered trees or bushes 210 from which it may pull produce 211 out of the trees or bushes 210 and deposit them on the conveyor 202. The trees or bushes may be manipulated and grown in an espaliered arrangement in order to provide a vertical tree-wall that the brush may be easily accessed by the one or more cylindrical rotating brushes of the rotary brush harvester. However, the rotary brush harvester may include brush arrangements that are operable to harvest produce from trees grown in other arrangements.

Figure 3:
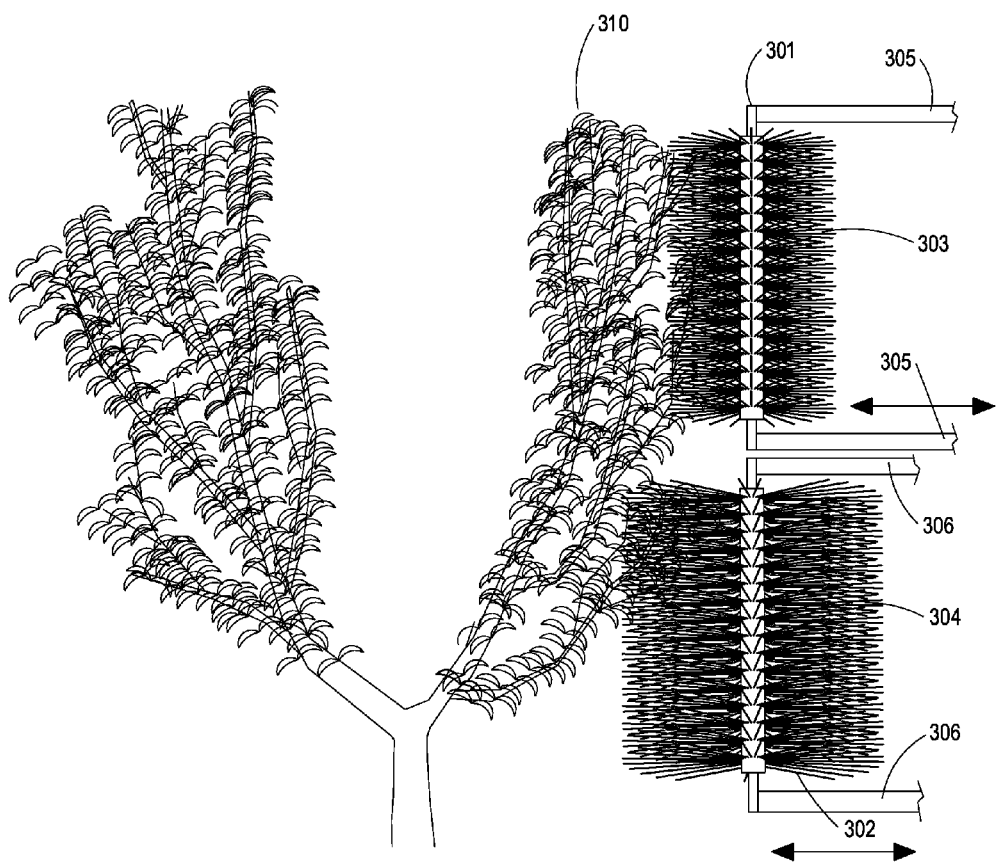
FIG. 3 shows a frontal view of an exemplary dual rotary harvesting brush arrangement according some embodiments of the present invention. Both the upper and lower brushes are engaged with portions of the tree.

In some embodiments, the rotary brush harvester may have multiple brushes (e.g., an upper brush and a lower brush) on a lateral side of the harvester. The lateral positions of the upper and lower brushes may be independently adjusted by moveable arms on which the brushes are mounted and that are attached to the rotary brush harvester. The moveable arms may be operable to adjust the pitch angles, the yaw angles, and/or the lateral insertion of each of the brushes into a row of trees or bushes. The adjustable lateral positions may allow the brushes to engage and harvest from different areas of a tree having an irregular outer shape (e.g., a rounded outer tree perimeter). In some examples, each of the brushes can be extended from the side of the harvester in a range from about 0 to 5 feet (e.g., about 0 to 3 feet, or any range of values therein). However it is to be appreciated that other distances are contemplated in accordance with embodiments of the present invention. The pitch angles of both of the brushes can be adjusted separately or together in a range from about 20° to about 70° (e.g., about 30° to about 60°, about 40° to about 50°, about 45°, or any value or range of values therein). Additionally, the upper and lower brushes may be equipped with radiating members of different lengths. For example, the lower brush may have radiating members that are longer than radiating members of the upper brush. The longer radiating member of lower brush may allow the lower brush to access shorter, more recessed limbs on the bottom portion of tree or bush without requiring the lower brush to be inserted further into tree or bush than upper brush. For example and without limiting the invention, FIG. 3 shows a brush arrangement that includes two rotating brushes on one side of a harvester. The upper brush 301 and the lower brush 302 have different diameters (upper brush 301 has shorter bristles 303, and lower brush 302 has longer bristles 304) that allow the brushes to harvest produce from different depths in trees 310 that may have an irregular perimeter shape (e.g., the V-shape of tree 310). In some embodiments, the position of the moveable arms may be controlled by a sensing system connected to rotating brushes (e.g., pressure or motion sensors) that sense changes in the contour of the trees or bushes with which the rotating brushes are engaged, and activate one or more mechanisms for automatically adjusting the positions of the moveable arms.

The functionality to individually position the brushes allows the harvester to be used on trees of varying shapes (e.g., espaliered trees, trellised, v-shaped, trees with unmanipulated growth, etc.). For example, the yaw angle of the brushes (e.g., brushes 301 and 302 shown in FIG. 3) can be adjusted to a yaw angle of 30° to accommodate the shape of a lower part of a tree have a roughly 30°, in order to maximize the amount of fruit that can be harvested in a pass.

Figure 4:
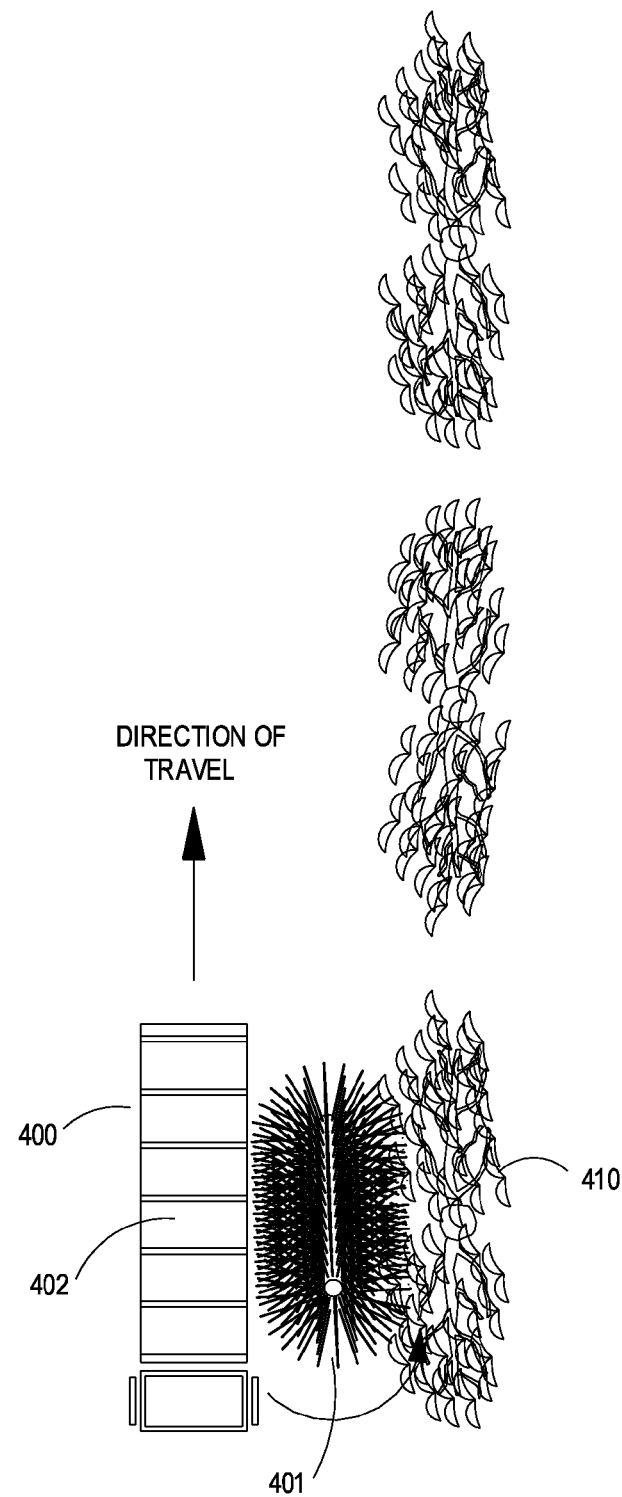
FIG. 4 shows a top-down view of an exemplary paired rotary harvesting brush and conveyor according to some embodiments of the present invention, in which the rotary brush is engaged with the tree. The view of the upper end of the axis of the rotary brush shows counter-clockwise rotation that spins the radiating members of the brush upward into the tree to draw fruit up and over the rotary brush and deposit them on the conveyor.

The rotary brush harvesters of the present invention may be driven or towed in a parallel fashion along a row of trees or bushes (e.g., espaliered or trellised trees), allowing the rotating harvesting brush to be engaged with the trees or bushes as the harvester passes. As an example and without limiting the invention, FIG. 4 shows the parallel direction of travel of a rotary brush harvester 400 relative to the row of trees or bushes 410. The parallel direction of travel in combination with the arrangement of the trees or bushes in an espaliered wall allows for the quick and efficient harvest of produce from the trees or bushes, without infliction of damage to the harvested produce. FIG. 4 also further illustrates the spin of the brush relative to the trees or bushes 410. The brush 401 is shown spinning counter-clockwise and upward into the tree or bush 410 with which it is engaged.

Figure 5:
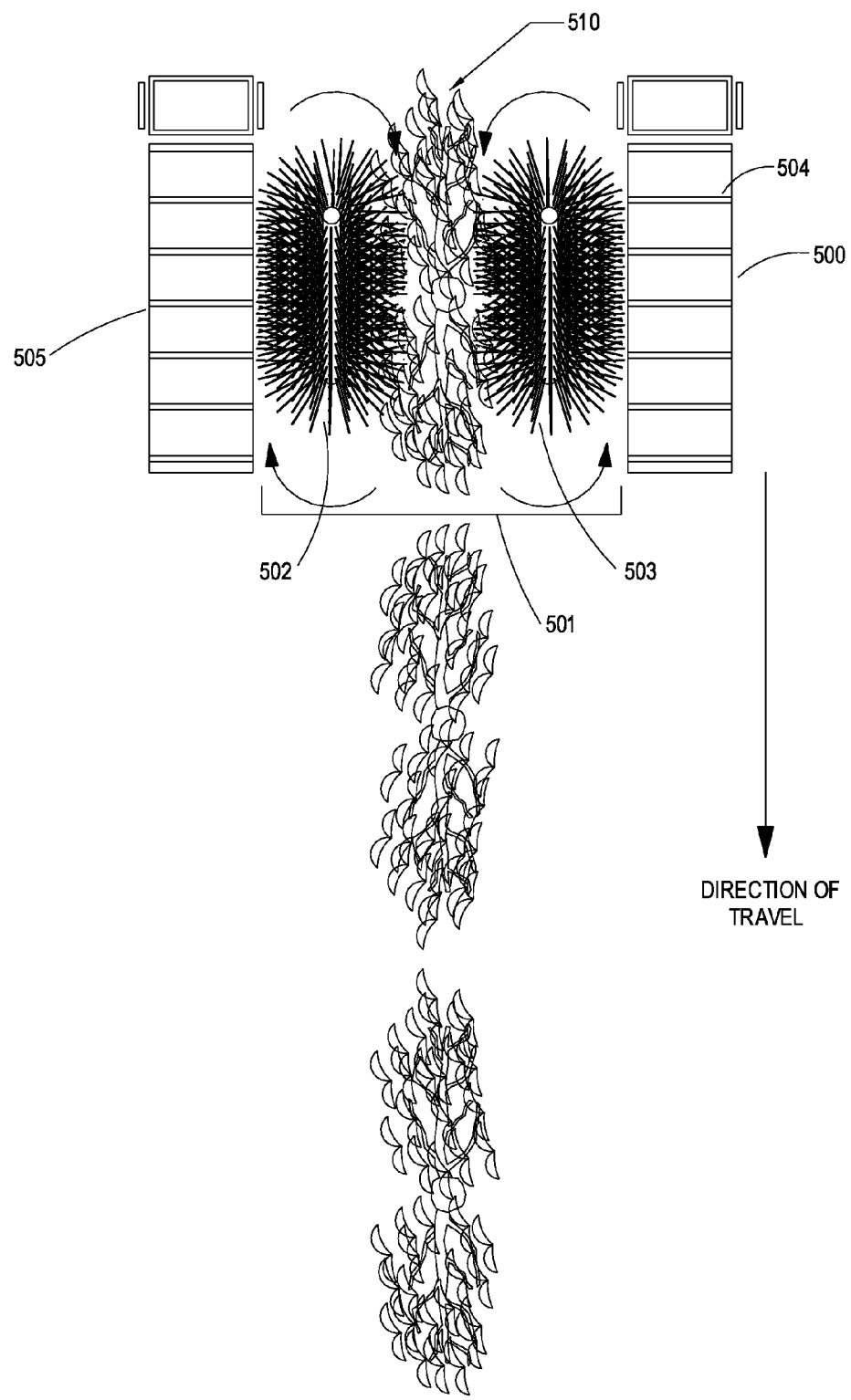
FIG. 5 shows top-down view of a dual-sided rotary brush arrangement according to some embodiments of the present invention. Each rotary brush is engaged with one side of a tree in a row of trees.

In some embodiments of the present invention, the rotary brush harvester may have rotating brushes on opposing sides of its chassis. The rotating brushes can be positioned within a tunnel that runs down the middle of the harvester's chassis. Each rotating brush may have a conveyor that is parallel and proximate thereto. As an example and without limiting the invention, FIG. 5 shows an example of a dual-sided rotary brush harvester 500. The harvester 500 includes rotating harvesting brush 502 paired with a conveyor 505 and rotating harvesting brush 503 paired with conveyor 504, with the pairs of brushes and conveyors on opposing sides of the harvester 500. The rotating brushes 502 and 503 are positioned within a tunnel 501 that runs down the middle of the chassis (not shown) of harvester 500. Such an arrangement of the brushes allows the rotary brush harvester to harvest produce from both sides of a row of trees or bushes in one pass, which may improve the efficiency of the harvesting process.

Figure 12:
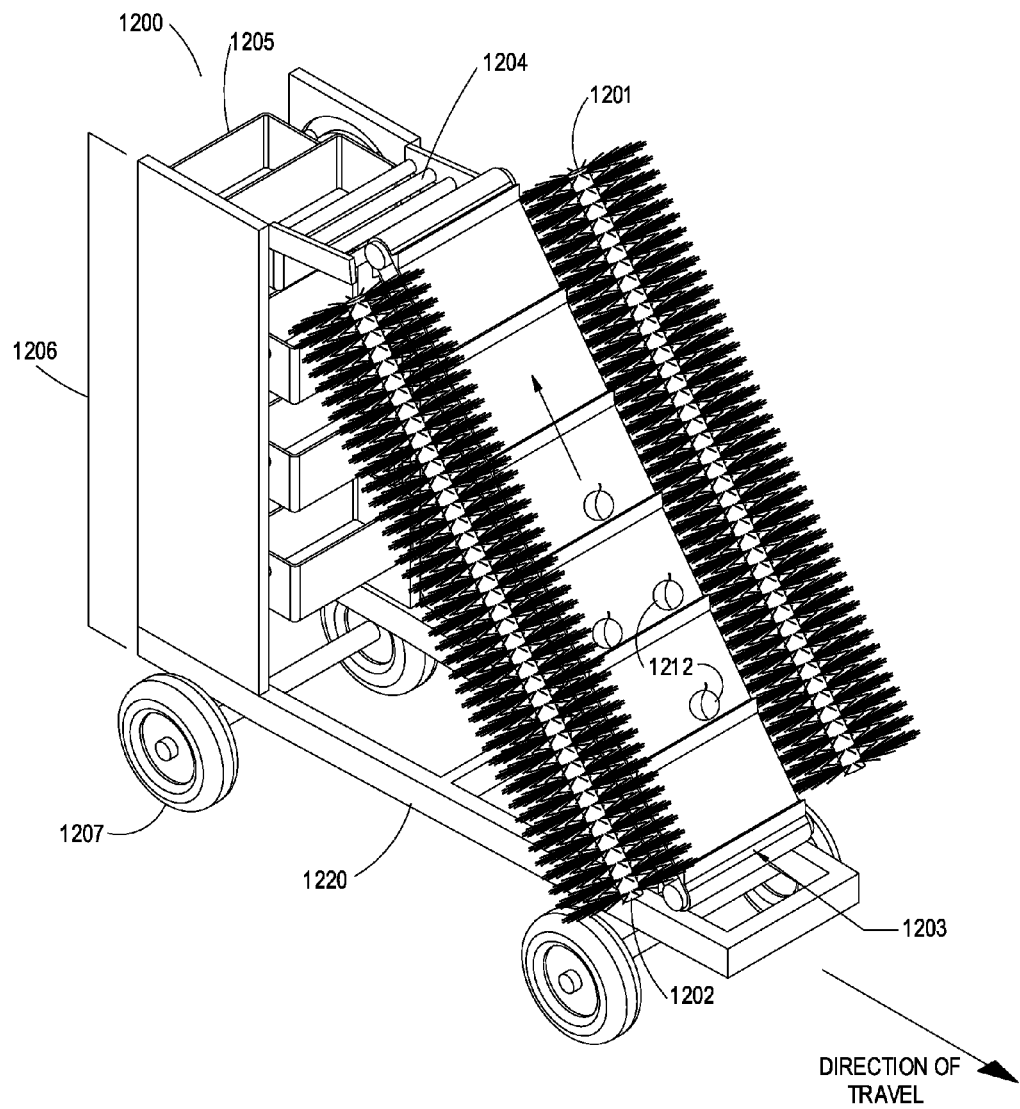
FIG. 12 shows perspective view of an exemplary dual-sided rotary brush harvester according to some embodiments of the present invention.
Figure 13:
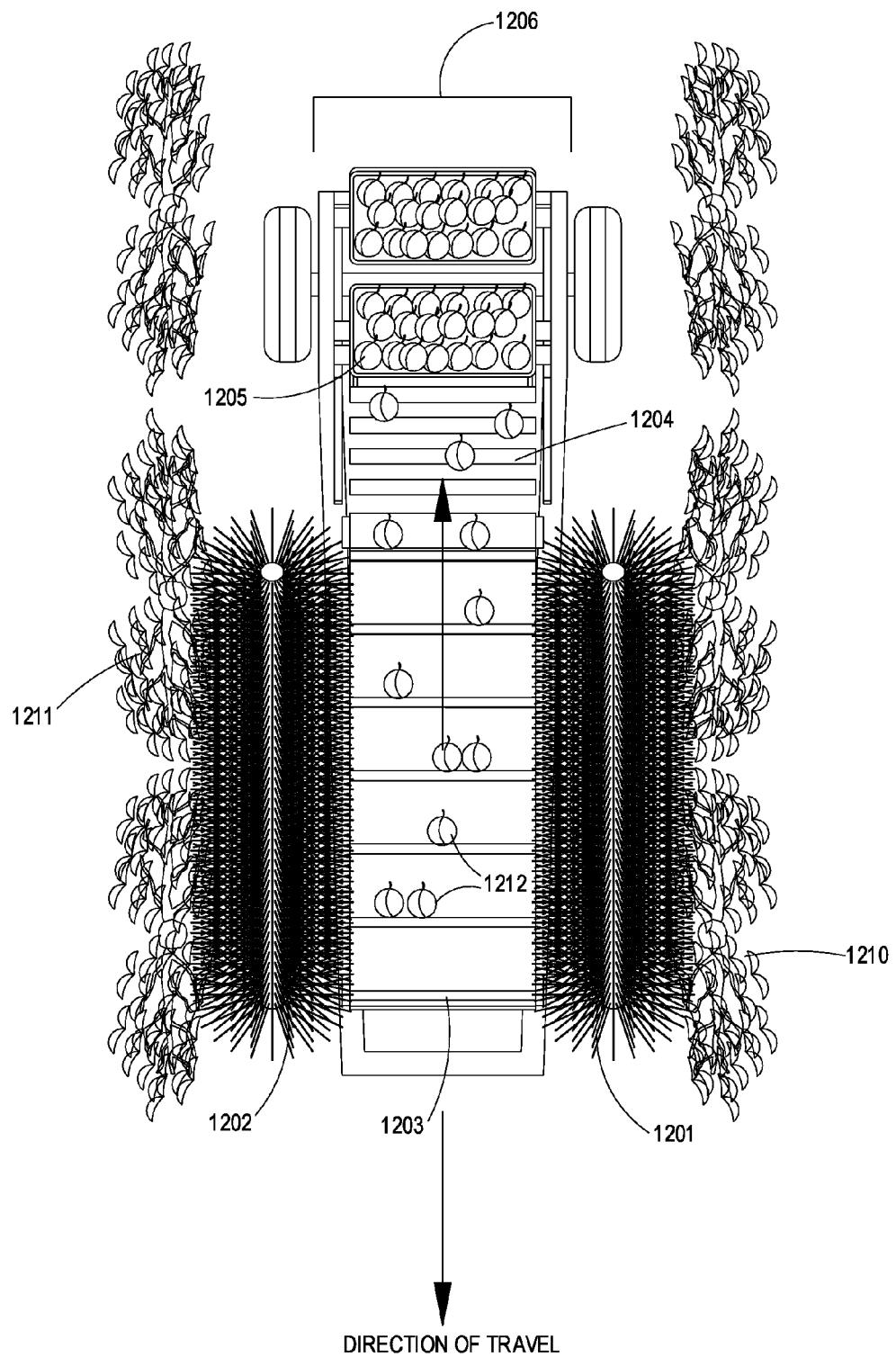
FIG. 13 shows a top-down view of the exemplary dual-sided rotary brush harvester of FIG. 12.

In some embodiments, the rotary brush harvester may have rotating brushes mounted on each of its lateral sides. The harvester may also include conveyors that are parallel, proximate, and medial to each of the rotating brushes. The harvester may alternatively have a single conveyor that receives produce from the rotating brushes on both sides of the harvester. In such embodiments, the brushes may be engaged with two adjacent rows of trees or bushes, as the harvester moves between the rows in a parallel manner. For example and without limiting the invention, FIGS. 12-13 show a dual-sided rotary brush harvester 1200 that may include two laterally mounted brushes 1201 and 1202 and a single, medially located conveyor 1203 for receiving produce from each brush 1201 and 1202. The first rotating brush 1201 may be engaged with a first row of trees 1210 and the second rotating brush 1202 may be engaged with a second row of trees 1211.

The brushes themselves may be relatively pliable and soft to prevent damage to the produce that it may harvest. The brush may comprise soft radiating members such as fibers, filaments, bristles, pegs, and combinations thereof that extend from a central axis (e.g., an axle or pole). The rotating brushes may have uniform or substantially uniform bristle lengths. In other embodiments, the rotating brushes may have bristles of several different lengths. For example, a rotating brush may have different sections running the length of the brush, where the sections have alternating patterns of bristle lengths. In other examples, the rotating brush may have different sections running the length of the brush, where the different sections have radiating members having different shapes (e.g., bristles, fibers, pegs, etc.) and/or different materials (e.g., polystyrene, polyester, rubber, foam, etc.).

Figure 6A:
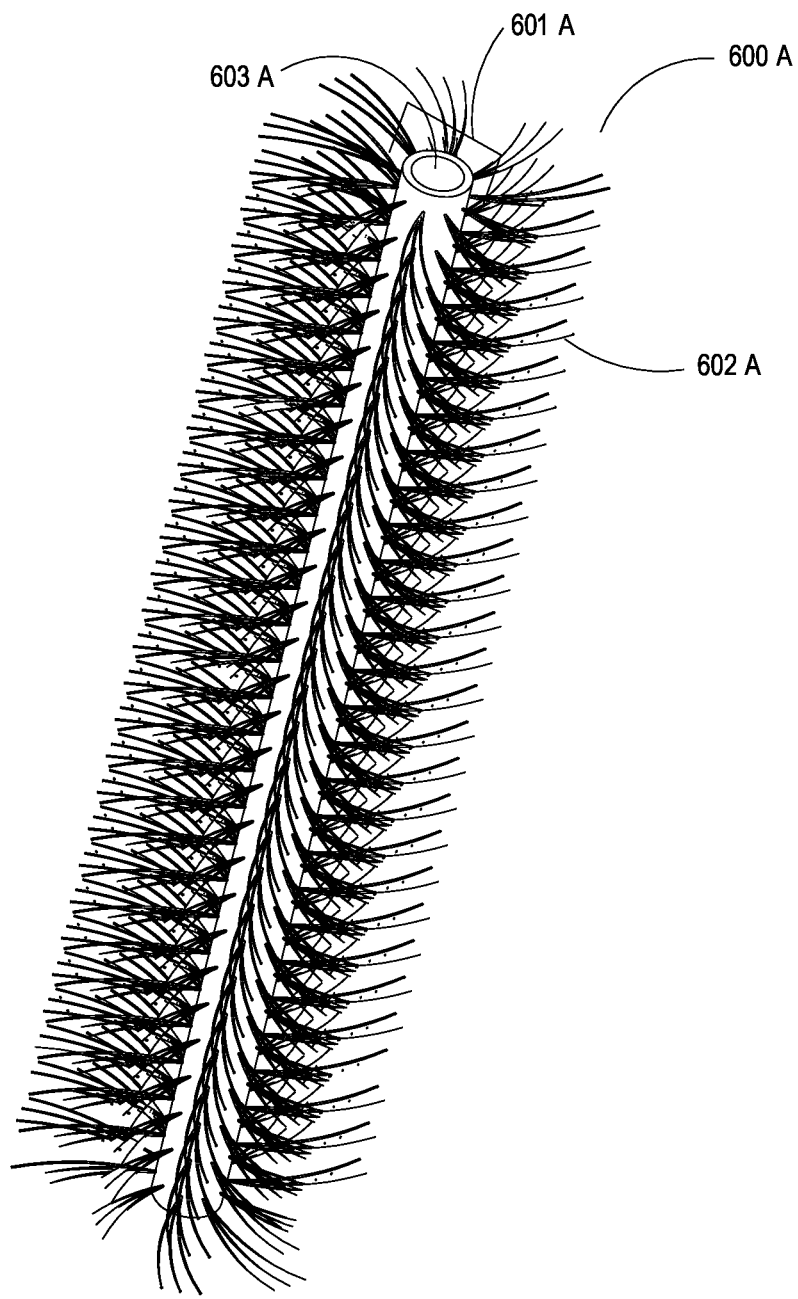
FIGS. 6A and 6B show exemplary embodiments of rotating harvesting brushes in accordance with some embodiments of the present invention.
Figure 6B:
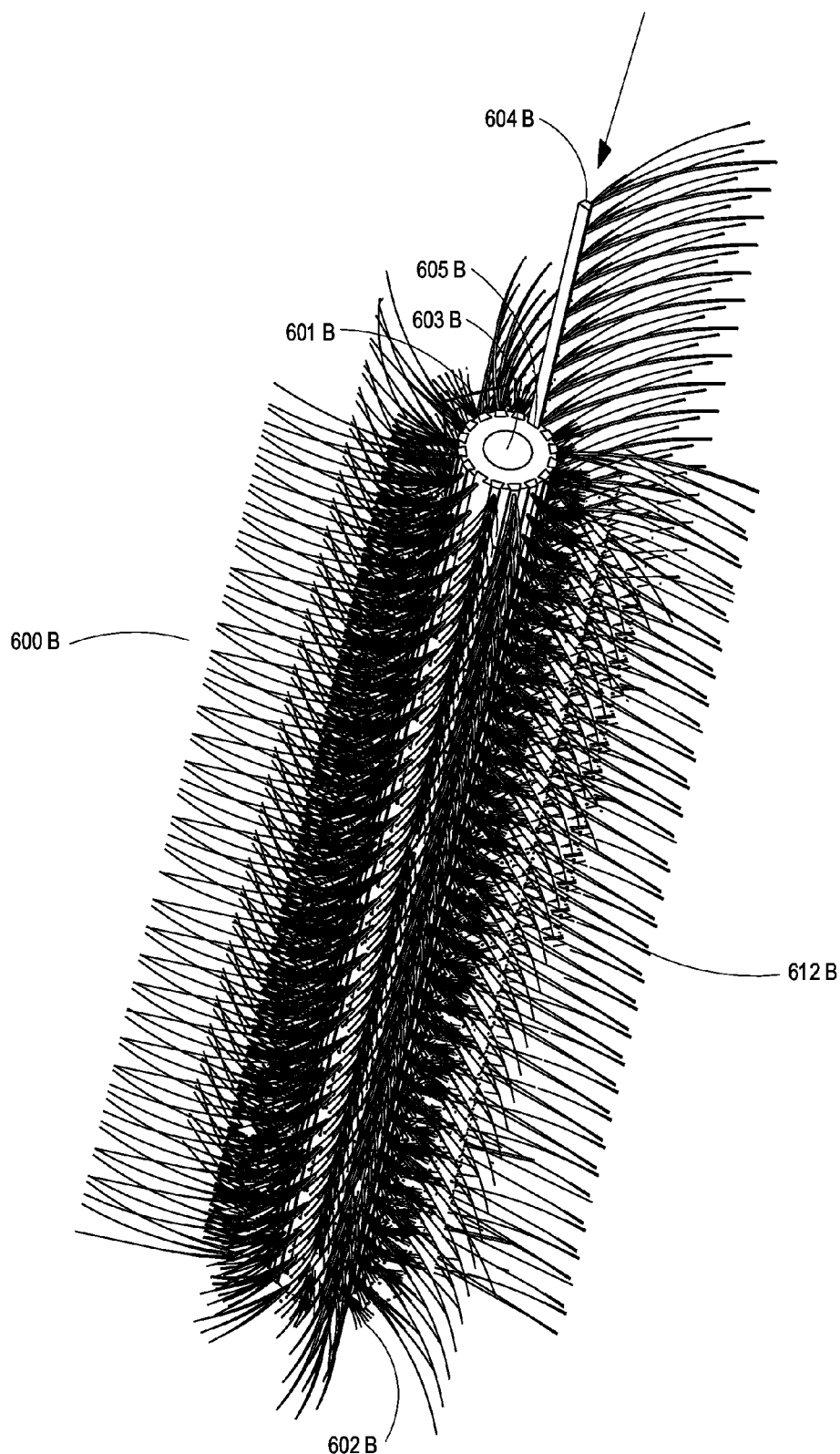

FIGS. 6A and 6B show, without limiting the invention, two different examples of rotating brushes. In FIG. 6A, the radiating members 602A of the brush 600A may be uniform and fixed to central axial member 601A. The central axial member 601A may have a central tunnel or hole 603A running the length of the central axial member 601A, configured to receive an axle. For example, the rotary brush harvester may have an axle on which the brush 600A may be installed and that is operable to spin the brush 600A. In FIG. 6B, the radiating axial members 602B and 612B of brush 600B are attached to a brush panels or sections 604B that are removable from the central axial member 601B. The length of the radiating axial members 602B and 612B may be different, and may be positioned in a pattern (e.g., an alternating pattern). For example, axial members 602B may be relative short fibers, and axial members 612B may be relatively long fibers. The central axial member 601B may have a central tunnel or hole 603B running the length of the central axial member 601B and configured to receive an axle. The central axial member 601B may also have slots or other receiving structures 605B for receiving the brush panels or sections 604B, as shown in FIG. 6B. As shown in FIG. 6B, the brush panels or section 604B may be slidably installed into the slots 605B.

The brush panels or sections 604B may alternatively be attached by a latching or locking mechanism, or other means for attaching the brush panels or sections 604B. The central axial member may include any number of slots, each able to receive an individual brush panel or section. For example and without limiting the invention, the central axial member may have 2 to 30 slots (e.g., 4 to 20 slots, 6 to 16 slots, 8 to 12 slots, 20 slots, 10 slots, or any value or range of values therein). This arrangement allows the bristles of the rotary brush to be changed to accommodate different crops or different stages of ripeness of the crops to be harvested.

The brush sections or panels may each run the axial length of the brush, and may each have a different arrangement of radiating members (e.g., a mixture of bristles of different diameters, materials, and/or lengths, a mixture of bristles and pegs, etc.). In one example, without limiting the invention, the brush panels or sections may be arranged in an alternating pattern, where sections having longer bristles (e.g., 12 in. bristles) are adjacent to sections having shorter bristles (e.g., 2 in. bristles) on either side. In other examples, without limiting the invention, each section may have the same arrangement of soft radiating members.

The fibers, filaments, or bristles of the brush may be made from various polymer materials (e.g., polyamides, polystyrene, polyester, polyolefin, polypropylene, polyurethane, polyvinylidene chloride, polyethylene, etc.; copolymers thereof; nylon; or other materials) in a soft, flexible fiber form. In other embodiments, the fibers, filaments, or bristles may include animal hair (e.g., horse hair, hog bristle, etc.), and other materials. The brushes or brush sections may include pegs made from soft foams (e.g., polyurethane foams, polyethylene foams, copolymer foams, etc., and combinations thereof with or without additional materials).

In some examples, and without limitation, the filaments or bristles may have diameters in the range from about 0.25 to about 2 mm (e.g., from about 0.5 mm to about 1.75 mm, from about 0.75 mm to about 1.5 mm, from about 1 mm to about 1.25 mm, about 1 mm, or any value or range of values therein). The filaments or bristles in the brush or within each brush panel may vary in thickness, and have a median thickness in the above range. In some examples, and without limitation, the density of the filaments or bristles in the brush or brush sections may be in the range of about $200/in.^2$ to about $2500/in.^2$ (e.g., about $300/in.^2$ to about $2000/in.^2$, about $500/in.^2$ to about $2000/in.^2$, about $800/in.^2$ to about $1500/in.^2$, about $400/in.^2$ to about $1000/in.^2$, or any value or range of values therein) depending on the diameter of the filaments or bristles. Without limiting the invention, the brush or brush section may have filaments or bristles having a mean diameter of about 1 mm and a filament density in a range of about $200/in.^2$ to about $650/in.^2$ (e.g., about $250/in.^2$ to about $500/in.^2$, about $300/in.^2$ to about $450/in.^2$, or any value or range of values therein). Additionally, the material of the filaments or bristles in the brush or within each brush panel may vary. The length of the filaments or bristles in the brush or within each brush section may also vary. In some examples, and without limitation, the length of the filaments or bristles may be in a range from about 5 in. to about 30 in. (e.g., from about 6 in. to 20 in., from about 8 in. to about 18 in., from about 10 in. to about 16 in., or any value or range of values therein). Thus, filaments or bristles of various materials (having different modulus), lengths, and diameters may be included in the brush to tailor the stiffness of the filaments or bristles to the produce to be harvested, so as to (1) avoid damaging the produce and (2) provide sufficient stiffness to the brush to remove ripe produce from their trees or bushes.

In some examples, and without limitation, the brushes may have an axial length in a range from about three feet to about 18 feet (e.g., about five to about fifteen feet, about 8 to about 12 feet, about 6 feet, or any value or range of values therein). In some examples, and without limitation, the brushes may have a diameter in a range from about one foot to about five feet (e.g., about two to about four feet, about three feet, or any value or range of values therein), depending on the length of the filaments or bristles thereon and/or the characteristics of the trees or brushes and produce to be harvested therefrom. In some embodiments, the central axial members may have a slot, hole, or tunnel (e.g., a cylindrical tunnel) running down the axial center of thereof for receiving an axle operable to spin the brush. As an example and without limiting the invention, FIG. 6 shows a tunnel 603A running down the center of central axial member 600A. The axle and the cylindrical tunnel may have complementary shapes in order to provide a snug fit and prevent the axle from slipping inside the slot. For example, the tunnel may include one or more grooves, notches, or other recesses or protrusions running down its length. The axle may in turn have protrusions or recesses that complement the shape of the recesses or protrusions in the tunnel. In some embodiments, the brush may have central axial member that acts as an axle itself. In such embodiments, the central axial member may be threaded, have a latch, joint, or include some other attachment means at each end thereof to affix the central axial member to rotating wheels configured to spin the brush. It is to be appreciated that the central axial member may have other shapes, features, and means of connection between it and the rotary brush harvester.

The brushes may be mounted onto moveable arms or a frame extending from a chassis that allows the angle of the brush to be modified in multiple planes (see, e.g., arms 305 in FIG. 3). In some examples, and without limitation, the moveable arms or frame may be operable to adjust a pitch angle of the rotary harvesting brush(es). As an example and without limiting the invention, the pitch angle of the rotary harvesting brush(es) may be adjusted within a range from about 20° to about 70° (e.g., about 30° to about 60°, about 40° to about 60°, about 45°, or any value or range of values therein) relative to the direction of forward travel of the rotary brush harvester. The moveable arms or frame may also be operable to extend or retract the brush laterally, so as to adjust to variations in width, thickness, or perimeter shapes of different trees or bushes. As an example and without limiting the invention, FIG. 3 shows arms 305 and 306 may be laterally adjustable, as indicated by the dual-headed arrows.

In some embodiments, the rotary harvesting brush(es) may also be tilted in order to accommodate the shape of the trees or bushes to be harvested. A yaw angle relative to the direction of travel of the one or more brushes may be adjusted. Thus, the one or more rotary harvesting brushes can be flared outward from the harvester to engage an underside, a top, or another non-vertical portion of the fruit bearing area of a tree or bush. In some embodiments, without limitation, the yaw angle may be varied in a range from about 0° to about 45° relative to the direction of travel (e.g., from about 0° to about 30°, from about 0° to about 20°, or any value or range of values therein). For example and without limitation, the lower of arms 306 may laterally extend further into tree 301 than the upper of arms 306 such that brush 304 is positioned about parallel to the lower portion of tree 310.

The rotation of the brushes may be driven by one or more motors engaged with the axles or central axial members of the brushes. Without limiting the invention, the one or more brushes may be driven by a single motor, which may be a hydraulic, electrical, or internal combustion motor. In other embodiments, each brush may be driven by a separate motor. The motor may drive wheels engaged with the axles or central axial members of the brushes thereby axially spinning the one or more rotary harvesting brushes. In some examples, without limitation, the motor may directly or indirectly drive the brushes as well as drive wheels engaged to a chassis housing the brushes to facilitate movement of the chassis along the trees. It is to be appreciated that other known methods for driving axial rotation may employed to spin the rotary harvesting brushes.

As mentioned above, the rotating brush harvester may have one or more conveyors, each associated with one of the one or more rotating harvesting brushes. As an example and without limiting the invention, FIG. 1 shows that each conveyor may have a pitch angle that is substantially equal to the pitch angle of the rotating brush with which it is paired. Without limiting the invention, each conveyor may have a pitch angle relative to the direction of forward travel of the rotary brush harvester in a range from about 20° to about 70° (e.g., about 30° to about 60°, about 40° to about 60°, about 45°, or any value or range of values therein). Each conveyor may be in close proximity to the rotating brush with which it is paired. For example, and without limitation, the conveyor may be about parallel to the brush at a distance of about 3 feet or less (e.g., 2 feet or less, 1 foot or less, or any value or range of values therein). For example, the conveyor may be located at the same vertical position or just below the brush axis (e.g., about 6 to 12 inches below the brush axis) and staggered from the brush toward the chassis and away from the trees or bushes (e.g., such that medial edge of the brush is aligned with the outer edge of the conveyor on a vertical plane). In some examples, and without limitation, the conveyor may have a width in a range from about 6 inches to about 8 feet (e.g., about 3 feet to about 8 feet, about 4 feet to about 6 feet, about 1 foot to about 3 feet, about 6 inches to about 2 feet, about 18 inches to about 2 feet, about 4 feet, about 2 feet, about 18 inches, about 1 foot, or any value or range of values therein). In some embodiments, the conveyor may be located close (e.g., within about 1 foot) to the rotating brush and may be relatively narrow. In such embodiments, the harvester may be configured to allow little to no change in the yaw angle of the brush. In other embodiments, the conveyor may be relatively wide (e.g., about 3 to 4 feet) because it may be further from the rotating brush (e.g., about 1 to 3 feet), and/or the harvester is configured to allow the yaw angle of the brush to be changed. In the latter embodiments, the greater width of the conveyor allows it catch produce from the entire length of the rotating brush, even when the brush has a yaw angle greater than 0°. In such embodiments, the conveyor may be placed below and overlapped with the brush, in order to catch produce when the brush has a yaw angle greater than 0°. In other embodiments, and without limitation, the conveyor may be relatively wide (e.g., 3 to 8 feet) because it may be configured to receive produce from harvesting brushes mounted on both lateral sides of the harvester. As an example and without limiting the invention, FIG. 12 shows a harvester 1200 having a conveyor 1203 that receives produce from brushes 1201 and 1202 mounted on opposite sides of the harvester 1200. It is to be appreciated that the speed of the conveyor, the speed of the brushes, and the speed of the rotary brush harvester along the trees are interrelated and may be controlled with reference to the density of produce to be removed from the trees.

In some embodiments, the one or more conveyors may be rotating belt conveyors that deposit produce thereon into a collection receptacle or bin. The belt conveyor may have cleats, ridges, pegs, round recesses, or other surface features configured to prevent the produce from rolling down the belt conveyor due to gravity. As an example and without limiting the invention, FIG. 2 shows the rotating brush 201 depositing the produce 211 on a belt conveyor 202 having cleats 203 for preventing the produce 211 from rolling down the conveyor belt. The anti-roll surface features further reduce the damage to the fruit by preventing them from rolling and gaining momentum down the grade of the conveyor and then colliding with other fruit or a part of the harvester. However it is to be appreciated that, in accordance with some embodiments, harvesters may include conveyors that permit the produce to gently descend down the conveyor. In such embodiments, the conveyor may have a slide and decelerating elements (for example, and without limitation, brushes for partially retaining the produce) to inhibit acceleration of the produce as it travels down the conveyor. In some embodiments, an upper surface of the belt conveyor may be made from a soft material, for example and without limitation, a soft foam (e.g., polyurethane foams, polyethylene foams, copolymer foams, etc., and combinations thereof with or without additional materials), rubber (e.g., cured rubber, polychloroprene, silicone, etc.), or other soft fabrics or materials to cushion the produce deposited thereon by the rotary harvesting brush. The harvester may also include retaining walls (no examples shown) along the side of the conveyors that is opposite to the rotating brush, in order to prevent the fruit from rolling off the side of the conveyor.

The rotary brush harvester may have an additional conveyor (not illustrated) for collecting fruit that misses the angled conveyor (e.g., falling below the rotating brush, or between the brush and the angled conveyor paired therewith). The additional conveyor may be located below the rotating brush and the angled conveyor, and may route produce that falls below the brush towards the lower end of the angled conveyor, allowing the fallen produce to be carried by the angled conveyor to the receptacles. The lower conveyor may include a belt conveyor and/or a roller conveyor. In embodiments of the rotary brush harvester that include brushes on opposing sides of the harvester, the harvester may have two such additional conveyors (not illustrated), one located on each side of the harvester below the paired rotating brush and angled conveyor.

Figure 7:
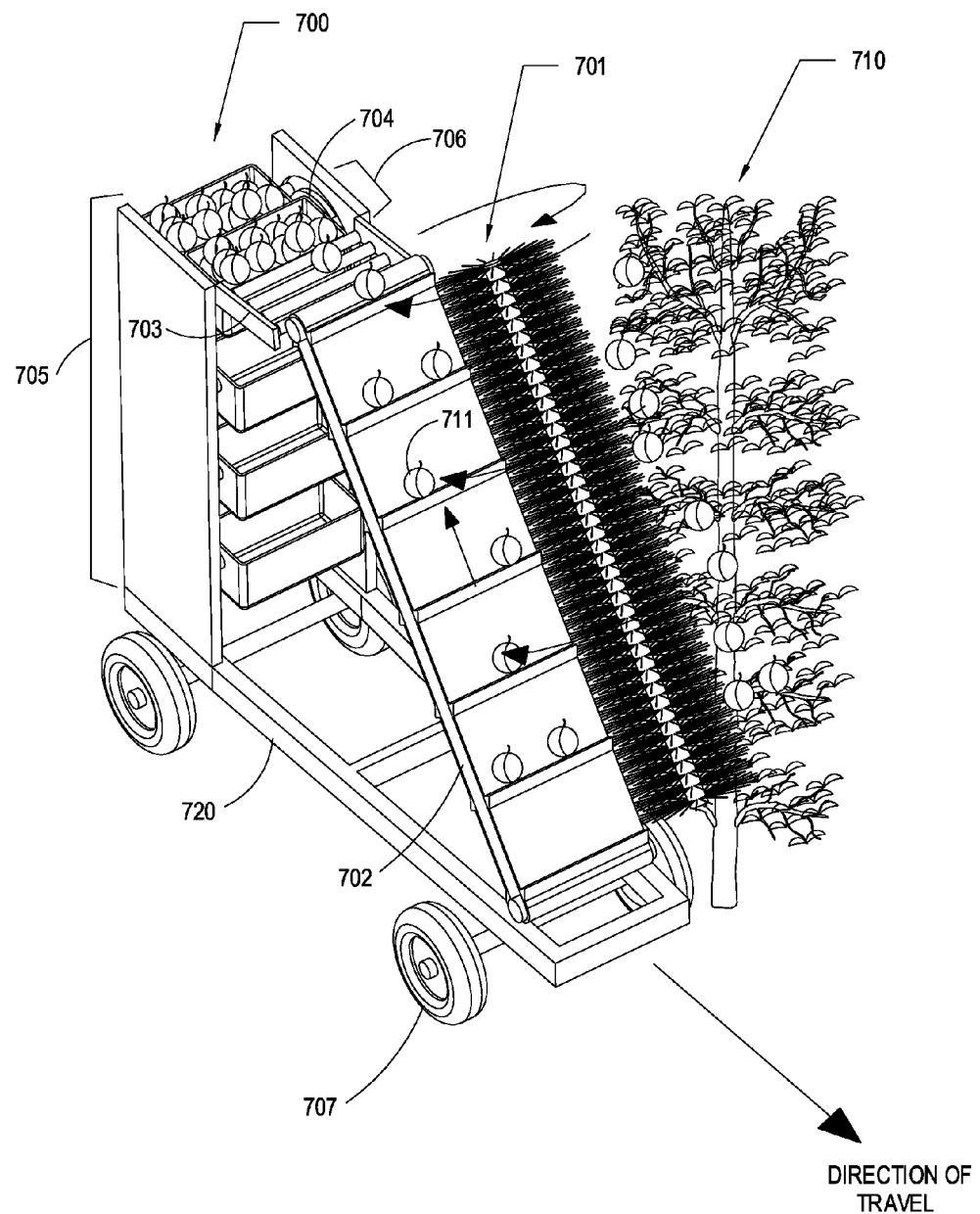
FIG. 7 shows a perspective view of a rotary brush harvester according to some embodiments of the present invention.

The rotating brush harvester may also include a roller conveyor located near an end of the one or more angled conveyors that receives the produce from the angled conveyors. For example and without limiting the invention, FIG. 7 shows a harvester 700 having an angled conveyor 702 that delivers produce 711 to a roller conveyor 703. The roller conveyor may have a roller bed configured to remove leaves, twigs, and other debris from the produce as they are passed over the roller conveyor. The individual rollers in the roller bed may be spaced apart to allow the leaves and other debris to fall between the rollers. In some examples, and without limitation, the individual rollers may be spaced at a distance in a range of about ⅛ inch to about 3 inches (e.g., about ½ inch to about 1.5 inches, about 1 inch, or any value or range of values therein). The roller conveyor may be motorized to spin the rollers therein and move the produce along the roller conveyor. In some embodiments, the roller conveyor may be powered by the same motor as the one or more rotary harvesting brushes and/or angled conveyor. In some embodiments, and without limitation, the roller conveyor may have a separate motor for driving the rollers. In other embodiments, the roller conveyor may not be motorized, and the rollers may spin passively as the produce is delivered to the roller conveyor. Retaining walls may be placed on one or both sides of the roller conveyor to keep the produce on the rollers until they are dumped into the collection bin.

The rotating brush harvester may further include one or more receptacles (e.g., bins) for collecting the produce from the roller conveyor or the angled conveyor. The receptacle may be placed at an opposite end of the roller conveyor (if provided) from the one or more angled conveyors, and just below the roller conveyor so that the receptacle catches the produce as it falls from the end of the roller conveyor. In some embodiments (e.g., embodiments that do not include a roller conveyor), the receptacle may be placed at the upper end of the angled conveyor(s), and just below the upper end of the angled conveyor(s). In other embodiments (e.g., embodiments that include a roller conveyor), the receptacle may be placed adjacent to a terminal end of the roller conveyor. For example and without limiting the invention, FIG. 7 shows a roller conveyor 703 depositing produce 711 in a bin 704. In some embodiments, and without limitation, the rotating brush harvester may include a plurality of receptacles mounted on a receptacle switching or replacing apparatus that places an empty receptacle at the end of the roller conveyor (or an angled conveyor, if provided) when a preceding receptacle is filled or substantially filled with the produce. For example and without limiting the invention, FIG. 7 shows a replacing apparatus 705 that may be a bin elevator that moves the bins 704 on a path having an "inverted U" shape. The bins may be moved along the path by a track or chain. In other embodiments, the bins may be moved up or down a vertical track. For example, the bins may be loaded on a vertical track such that they are sequentially lowered into position at the end of the roller conveyor (or an angled conveyor) as the foregoing bin is filled or substantially filled with produce. In some embodiments, the rotary brush harvester may have a single, large receptacle for collecting the produce.

The rotary brush harvester may be a self-propelled vehicle, having a motor, a transmission, a drive train, brakes, an exhaust system, etc., allowing the harvester to be driven down a row of trees or bushes to be harvested. In some embodiments, the motor may also drive the rotation of the brushes, the angled conveyor(s), and/or the roller conveyor(s). For example and without limiting the invention, the motor may have a gear system that drives one or more belts or chains that are each engaged with an axle of a rotary harvesting brush. Such a gear system may be adjustable to rotate the one or more harvesting brushes at variable speeds. In some embodiments, the harvester may be a passively mobile vehicle (e.g., a trailer) on which the brushes, conveyors, and receptacle system are mounted.

Harvester Embodiments

The arrangement of the brushes and conveyors on the harvester may be varied based on the desired application of the brush harvester. In some embodiments, the harvester may have brushes and conveyors on a single side of a chassis (see, e.g., FIG. 7). In other embodiments, the harvester may have brushes on two sides of a chassis. For example and without limiting the invention, the harvester may have a tunnel in the center of a chassis with brushes on either side of the tunnel, allowing the harvester to pass a row of trees or bushes through the center of the chassis and harvest produce from both sides of the row (see, e.g., FIG. 8). In other examples and without limiting the invention, the harvester may have brushes on both of the lateral sides of the chassis, allowing the harvester to pass between two rows of trees or bushes and harvest fruit from each row (see, e.g., FIG. 12). Various embodiments of the rotary brush harvester are discussed in further detail below.

One-Sided Harvester

Some embodiments of the rotary brush harvester may have one or more angled rotating brush(es) on one lateral side of a chassis. The brush may have any given pitch angle. For example and without limitation, the one or more brush(es) may have a pitch angle in a range from about 20° to about 70° (e.g., about 30° to about 60°, about 40° to about 50°, about 45°, or any value or range of values therein). As an example and without limiting the invention, FIG. 7 shows a harvester 700 that may include a single brush 701 at a pitch angle of about 45° on one lateral side of the harvester 700 that can be engaged with tree or bush 710 in a row of trees or bushes as the harvester moves along the row. The harvester may have an angled conveyor (e.g., a belt conveyor) paired with the rotating brush, and in close proximity to the brush. The conveyor may be about parallel to the rotating brush and run the length of the rotating brush. In other examples and without limiting the invention, the pitch angle of the brush may differ from the pitch angle of the rotating brush. The conveyor may also be proximate to the rotating brush. For example, and without limitation, the conveyor 702 may be about parallel to the brush 701 at a distance of about 1 foot or less. Additionally, the conveyor may be located below the axis of the rotating brush in the vertical dimension. For example and without limiting the invention, the conveyor may be about 1 to 6 inches below the axis of the rotating brush. The conveyor may also be staggered from the rotating brush toward a chassis of the harvester. For example and without limiting the invention, FIG. 7 shows a conveyor 702 that may be located medially on the chassis 720 of harvester 700 and away from the trees or bushes 710 (e.g., such that medial edge of the brush 701 is aligned with the outer edge of the conveyor 702). The conveyor 702 may also be located slightly below the axis of brush 701. Such arrangements of the conveyor and the rotating brush allow the conveyor to catch produce harvested by the rotating brush without any substantial vertical fall and without damage to the produce. FIG. 7 illustrates a conveyor 702 that may catch produce 711 that removed from tree 710 and carried up and over the brush 701 toward the conveyor 702, as indicated by the curved arrows. The conveyor may include a retaining wall on a side opposite to the rotating brush for preventing produce from rolling off of the side of the conveyor. The conveyor may also include a wall on a side wall adjacent to the rotating brush.

In some embodiments, the angled conveyor may be a belt conveyor that rotates in direction that carries the produce placed thereon by the rotating brush upward toward a roller conveyor or a receptacle for collecting the produce. The conveyor may have cleats, pegs, or other structures to prevent the produce from rolling, sliding, or falling down the conveyor. As an example and without limiting the invention, FIG. 7 shows a belt conveyor 702 having cleats thereon for preventing fruit 711 from rolling down conveyor 702. However, it is to be appreciated that they conveyor may have a slide and decelerating features enabling the produce to slide down the conveyor at a controlled rate. The conveyor may also have a retaining wall (not illustrated) at its base for preventing the produce from falling off of the harvester. The conveyor may be positioned so that the upper end of the conveyor is adjacent to a roller conveyor or a receptacle for collecting the produce. The roller conveyor may be configured to remove debris from the harvested produce prior to the deposition of the fruit in collection receptacles. The roller conveyor may have gaps between the rollers. Without limiting the invention, the gaps between the rollers may be in a range of ¼ in. to about 3 in. (e.g., about ½ in. to about 1.5 ins., about 1 in., or any value or range of values therein). As an example and without limiting the invention, FIG. 7 shows a roller conveyor 703 that receives fruit 711 from an upper end of a conveyor 702. The conveyor 702 can deposit produce 711 on the roller conveyor 703 in this configuration. In some examples, and without limitation, the roller conveyor may be motorized such that the rollers are propelled by the motor and move the produce toward collection receptacles (e.g., agricultural bins). In other non-limiting examples, the roller conveyor may be passive.

The single-sided rotary brush harvester may also have an additional spill conveyor (not illustrated) below the rotating brush and the angled conveyor, as described above. In some examples, and without limitation, the additional spill conveyor may run horizontally and be located at the level of the lower end of the conveyor. For example and without limiting the invention, a spill conveyor may be included in the rotary brush harvester 700 shown in FIG. 7 below rotating brush 701 and the conveyor 702, such that it is horizontal and located in the base of the chassis 720 below the lower end of conveyor 702 (the end near the front of the harvester 700). In some examples, and without limitation, the spill conveyor may be positioned beneath the rotating brush, either horizontally or parallel to the brush. The spill conveyor may catch harvested produce that falls from the brush and does not make it onto the conveyor. The spill conveyor may then route the harvested produce to the lower end of the conveyor, such that the produce caught by the spill conveyor is placed on the conveyor to be conveyed to collection receptacles.

The collection receptacles (e.g., agricultural bins) may be mounted on an elevator capable of changing the position of the receptacles. For example, and without limitation, FIG. 7 shows a bin elevator 705 that may be a structure having an inverted U or horse shoe-shaped track on which bins 704 are mounted. The elevator may be operable to position the bins such that an empty bin is moved into a position at an end of a roller conveyor or an angled conveyor, where the empty bin can receive produce coming off of the conveyor. As a bin at an end of the conveyor becomes full or substantially full of produce, the elevator can change the position of the bins such that the full bin is replaced the position with an empty bin. For example and without limiting the invention, FIG. 7 shows a bin elevator 705 that may replace the bin in position 706 with an empty bin when the bin in position 706 becomes full or substantially full with produce 711.

The elevator may be driven by a motor, which may be a separate motor or it may be connected to a motor driving the rotary brush harvester, the conveyor(s), or means for driving the rotary brush harvester along a row of trees. The operation of the elevator may be automated so that when a bin is substantially full, a sensor (not illustrated) detects that the bin is full or substantially full and the elevator replaces the full or substantially full bin with an empty bin. Without limiting the invention, the sensor may be a force sensor attached to the track or chain to measure the strain created by the weight of the bins, a light sensor that is tripped when the produce in the bin reaches a certain level, or a timer that switches the bins after a certain amount of time. It is to be appreciated that other known automation methods may be used for triggering the elevator to switch out the full or substantially full bin. In some embodiments, the bins may be switched by a human operator of the rotary harvester. For example and without limiting the invention, the elevator may be operable to change the positions of the bins by a mechanical, motorized, or electrical switch that is controllable by the operator.

The rotary brush harvester may be passively mobile or it may be self-propelled. In some embodiments, where the harvester is self-propelled, the harvester may include a motor, transmission, drive train, etc. (no examples shown) that drive the vehicle forward on the wheels and tires. For example and without limiting the invention, the harvester 700 shown in FIG. 7 may be equipped with a diesel or gasoline internal combustion engine (not shown) that drives wheels and tires 707. The harvester 700 may be driven down a row of trees or bushes 710 (e.g., parallel to the row) in the direction indicated by the arrow in FIG. 7. Additionally, the harvester may include an operator's seat and controls for operating and driving the vehicle (not illustrated). In such embodiments, and without limitation, the chassis may be wider to accommodate an operator's seat and controls on a side of the harvester opposite to the side on which the rotating brush is installed. Other placements of the operator's seat and controls may be implemented. In embodiments where the harvester is passively mobile, it may have a one or more trailer hitches or other means for attaching the harvester to a towing vehicle (e.g., a truck or tractor).

In other non-limiting embodiments, a one-sided harvester may have one or more angled harvesting brushes that may be paired with a conveyor having a slide that is substantially parallel thereto. For example and without limiting the invention, the conveyor 702 in FIG. 7 may have a slide running parallel to the brush 701 that catches the fruit 711 coming off of the brush 701. In some examples and without limiting the invention, the slide may have a wedge shape such that one side runs about parallel to the harvesting brush and the opposite side runs horizontally along the chassis. In some example and without limiting the invention, the slide may also have a lateral slant or curvature relative to the horizontal that slows the produce as it rolls down the slide. For example and without limiting the invention, the slide may provide a surface slanted toward a lateral side of the harvester in a range of about 30° to about 60° (e.g., about 45°, or any value therein). Bins or trays may be positioned at the base of the slide, e.g., near the bottom of the chassis for collecting the produce as it leaves the slide. Texturing and/or decelerating elements may be provided to prevent the produce from traveling too quickly down the slide. For example and without limiting the invention, the slide may have bumps thereon, and/or decelerating elements suspended over the slide, such as fingers, brushes, gates, etc. In such embodiments, the slide may deposit produce on a conveyor located in the base of the chassis. The conveyor may then move the produce to bins that may be located at the front or back of the harvester. In such embodiments, the conveyor may include an about horizontal motorized conveyor (e.g., a belt conveyor or a roller conveyor). The bins in such embodiments may be mounted on a bin elevator located at the front or back of the harvester and having a U-shaped track for the movement of the bins. The conveyor may deposit produce in a bin located at an end of the conveyor, and when the bin is full or substantially full, the bin elevator may replace the full bin with an empty bin.

In further non-limiting embodiments, one or more brushes may be mounted on the side of a mobile trailer or a truck bed. The one or more brushes may each be paired with a conveyor having a slide (e.g., a slide that runs the length of the brush) that leads into the bed of the trailer or the truck bed. The produce may be deposited by the brush on to the corresponding slide and may then roll down the slide into the bed or one or more bins present in the bed.

Two-Sided Harvester

In some embodiments of the present invention, a rotary brush harvester can include a central tunnel having rotating brushes mounted on either side of the tunnel. In other embodiments, the rotary brush harvester may include brushes mounted on lateral sides (e.g., on the outer sides) of the chassis. Some two-sided embodiments of the rotary brush harvester are described in more detail below.

In some embodiments of the invention, the rotary brush harvester may be a row harvester having a central tunnel running down the middle of the harvester for receiving a row of trees or bushes (e.g., espaliered or trellised trees or bushes). The harvester may be driven down a row of trees or bushes, with the row passing through the tunnel. Angled rotating harvesting brushes may be on one side or both sides of the tunnel, and may remove produce from the trees as the harvester passes over the row. In some examples, without limitation, the rotating brushes may each have a pitch angle in a range from about 20° to about 70° (e.g., about 30° to about 60°, about 40° to about 50°, about 45°, or any value or range of values therein), and they may both have about the same pitch angle. The rotating brushes may each be paired with a conveyor parallel thereto. The conveyor may be proximate and lateral to the rotating brush. For example, and without limitation, each conveyor may be about parallel to the corresponding brush and at a distance therefrom of about 1 foot or less. Without limiting the invention, the conveyors may also be just below (e.g., about 1 to 6 inches) the axis of the corresponding brush in the vertical dimension and laterally staggered from the brush (e.g., such that lateral edge of the brush is aligned with the medial edge of the conveyor). As an example and without limiting the invention, FIGS. 8-11 illustrate a row harvester 800 having two rotating brushes 802 and 803 on either side of a tunnel 801. Each of the rotating brushes 802 and 803 may have a pitch angle of about 45° and may be paired with a conveyor (e.g., conveyors 804 and 805, respectively) parallel thereto. The conveyors 804 and 805 may be in close proximity to the corresponding brushes 802 and 803, respectively.

Figure 8:
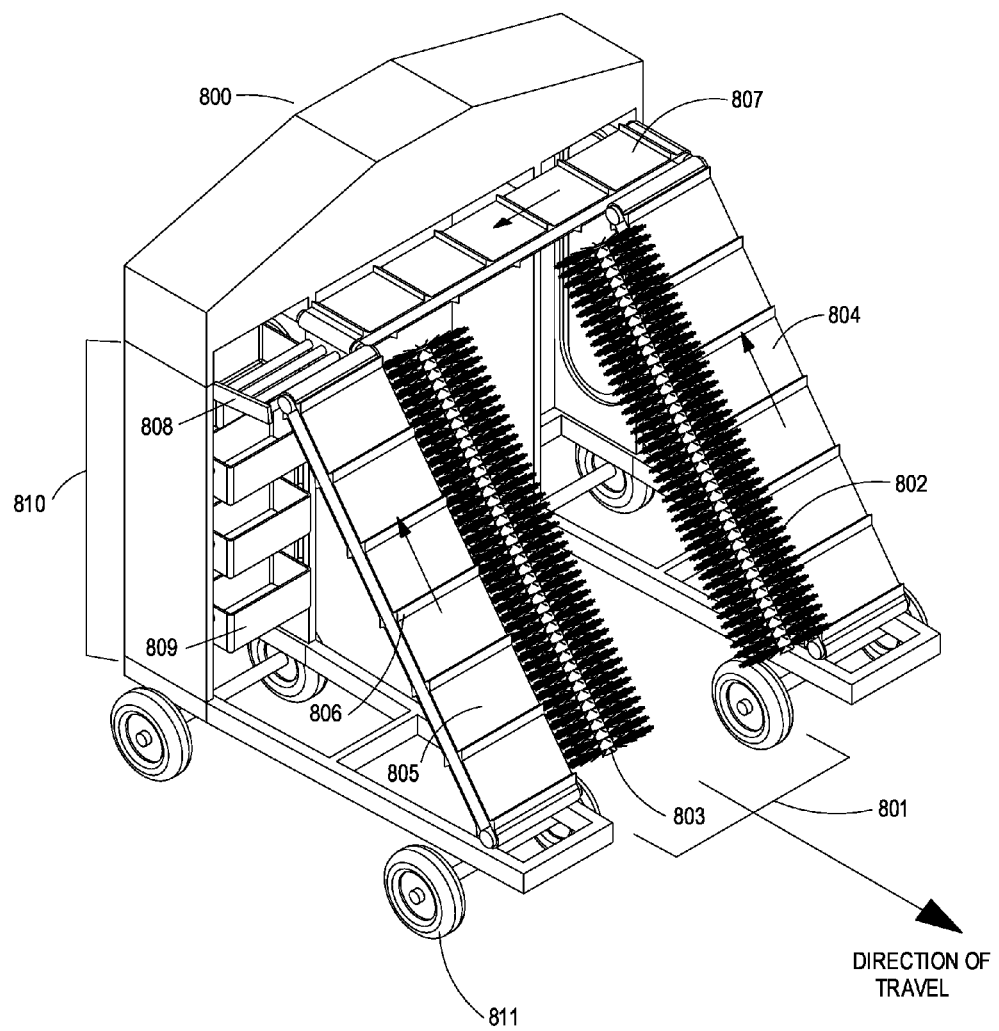
FIG. 8 shows perspective view of an exemplary dual-sided rotary brush harvester according to some embodiments of the present invention.
Figure 9:
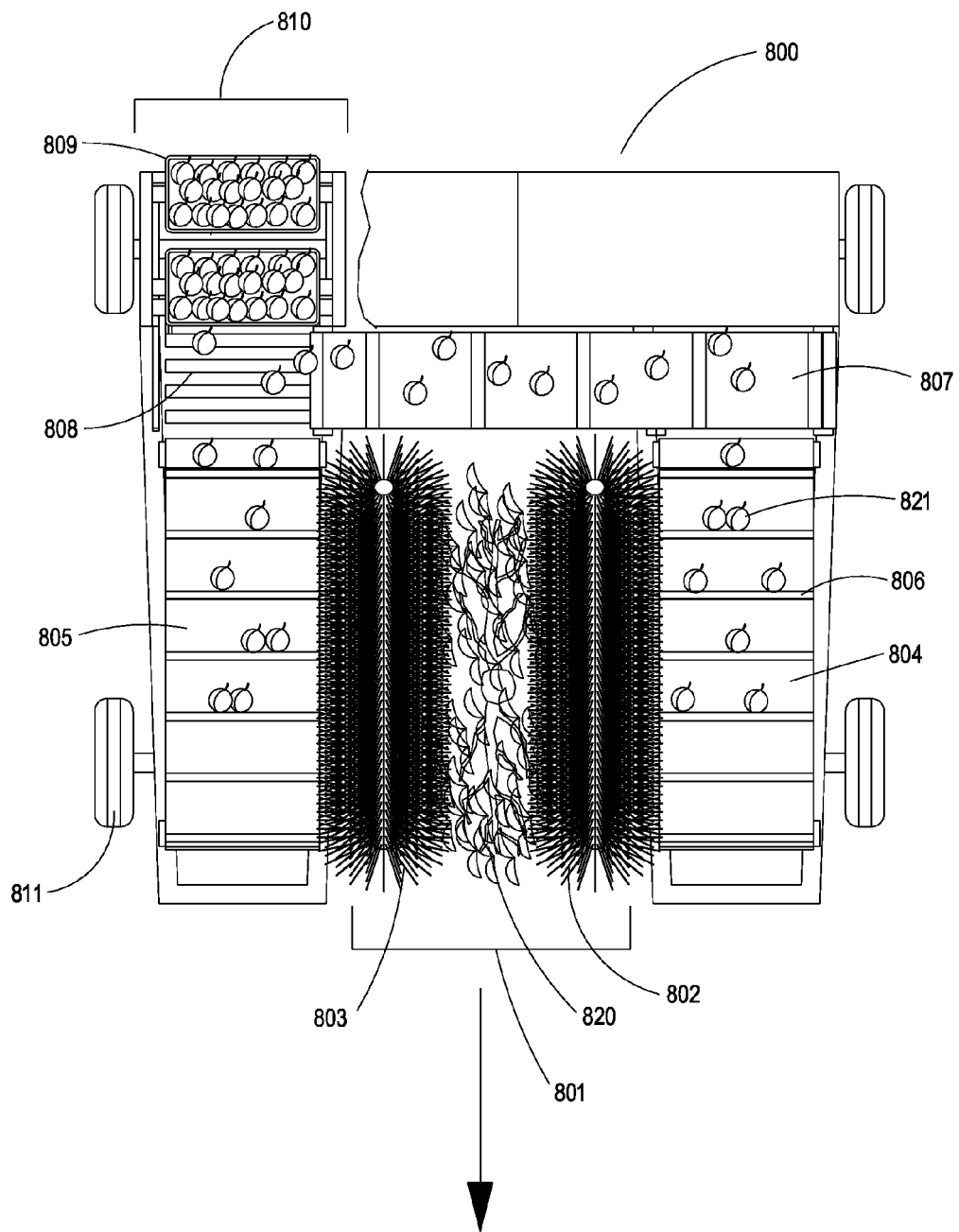
FIG. 9 shows a top-down view of the exemplary dual-sided rotary brush harvester of FIG. 8.
Figure 10:
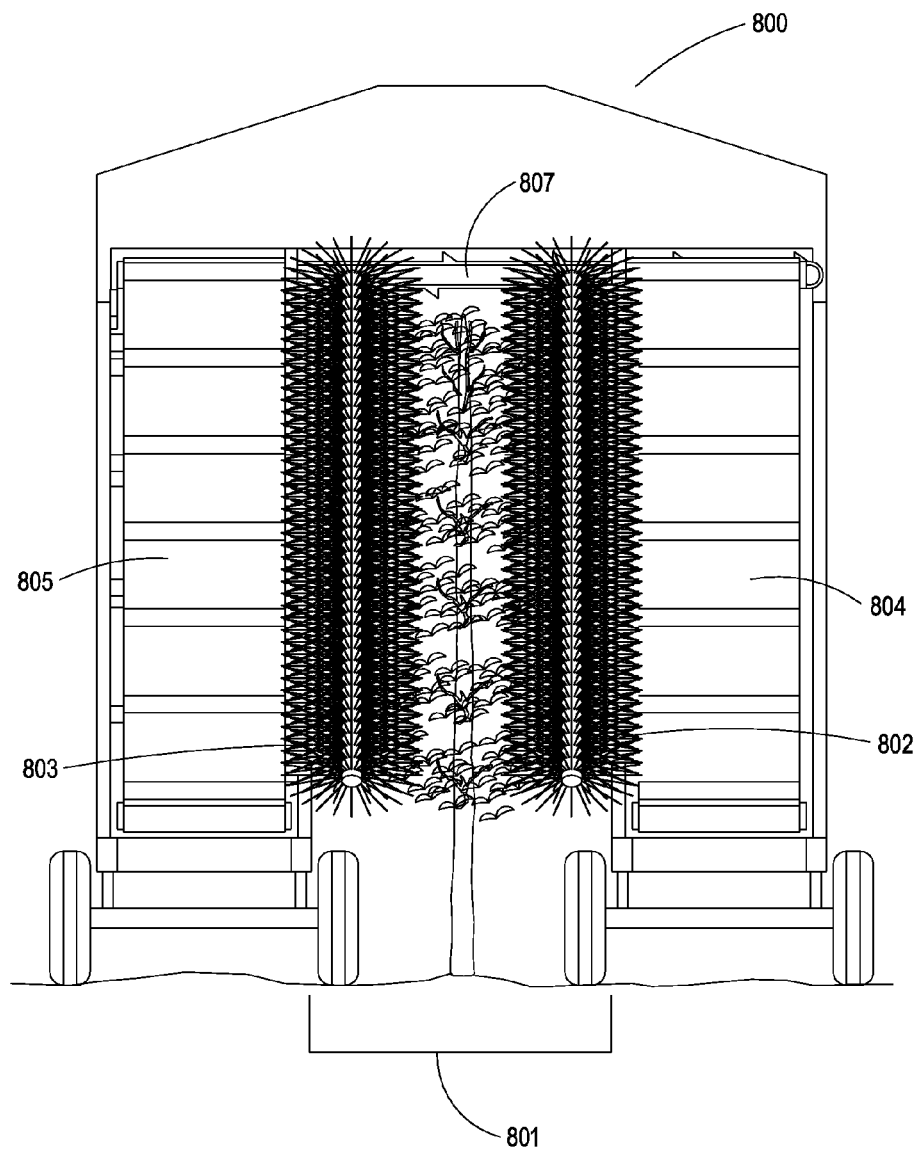
FIG. 10 shows a frontal view of the exemplary dual-sided rotary brush harvester of FIG. 8.

In some embodiments, the conveyors may be belt conveyors for catching the produce as it is deposited thereon by the corresponding rotating brush. As an example and without limiting the invention, FIGS. 8-9 shows rotary brush harvester 800 having conveyors 804 and 805 that catch produce 821 removed from tree 810 and carry the harvested produce 821 upward and toward the back of the harvester 800, as indicated by the arrows in FIG. 8. The conveyors may have cleats, pegs, or other structures to prevent the produce from rolling down the conveyors. For example and without limiting the invention, FIG. 9 shows harvester 800 having conveyors 804 and 805 having cleats 806 for preventing produce 821 from rolling down the conveyors 804 and 805. In some embodiments, each conveyor may include one or more retaining walls on an outer side opposite to the corresponding rotating brush for preventing produce from rolling off of the side of the conveyors. The conveyors may also have a retaining wall at its base for preventing the produce from falling off of the harvester.

The rotary brush harvester may include a roller conveyor positioned at the top end of one or both of angled conveyors. The roller conveyor may have rollers that are spaced apart to allow for the removal of debris, such as leaves and twigs, from harvested produce (as described above) that may be deposited thereon by one or both of the angled conveyors. As an example and without limiting the invention, FIG. 9 shows a roller conveyor 808 on one side of the harvester 800, which may be configured to deliver produce 821 to bins 809. In some non-limiting examples, the roller conveyor may be motorized such that the rollers are propelled by the motor and move the produce toward collection receptacles (e.g., agricultural bins). In other non-limiting examples, the roller conveyor may be passive. The roller conveyor may deliver harvested produce into the collection receptacles. The roller conveyor may include a retaining wall on its lateral side to prevent the produce from rolling off.

In some embodiments, the rotary brush harvester may have a roller conveyor and collection receptacles on one side of the harvester. As an example and without limiting the invention, FIG. 9 shows a harvester 800 having a roller conveyor 808, bins 809, and a bin elevator 810 on one side of the harvester 800. However, it is to be appreciated that in accordance with some embodiments of the present invention, a rotary harvester may include roller conveyors and bins on each side thereof. For example, and without limitation, each of the angled conveyors may deposit produce onto separate roller conveyors on each side of the rotary brush harvester, and each such roller conveyor may deposit produce into bins on each side of the rotary harvester. It is further to be appreciated that in some embodiments of the present invention, rotary brush harvesters can omit roller conveyors and instead deposit harvested produce directly into bins.

In embodiments in which the roller conveyor and one or more collection receptacles are on one side of the rotary brush harvester, the rotary brush harvester may include a transverse conveyor (e.g., a third belt conveyor) running across the harvester. The transverse conveyor may receive produce from one of the angled conveyors and then move the produce laterally across the harvester to deliver the produce to a roller conveyor or collection receptacles. As an example and without limiting the invention, FIG. 9 shows a harvester 800 having a conveyor 804 that may deliver the harvested produce 821 to a transverse conveyor 807 (e.g., a third belt conveyor). The transverse conveyor 805 may route the produce 821 across the back of the harvester 800, over the tunnel 801, and onto the roller conveyor 808. It is to be appreciated that in some embodiments the transverse conveyor may be configured to deliver produce directly to the one or more collection receptacles.

The rotary brush harvester may also have additional spill conveyors (not illustrated) on each side of the harvester that are below the rotating brushes and/or the angled conveyors. In some examples, and without limitation, these additional spill conveyors may run horizontally and be located at the level of the lower ends of the angled conveyors. For example and without limiting the invention, spill conveyors may be included in the rotary brush harvester 800 shown in FIG. 8, one below rotating brush 802 and the conveyor 804, and another below rotating brush 803 and the conveyor 805, such that they are horizontal and located in the base of the chassis below the lower ends of conveyors 804 and 805 (the ends near the front of the harvester 800). In some examples, without limitation, spill conveyors may be provided beneath the brushes 802, either horizontally or parallel to the brushes 802. These spill conveyors may catch harvested produce that falls from the rotating brushes and do not make it onto the angled conveyors. The spill conveyors may then route the harvested produce to the lower ends of the angled conveyors, such that the produce caught by the spill conveyors is placed on the conveyors.

Figure 11:
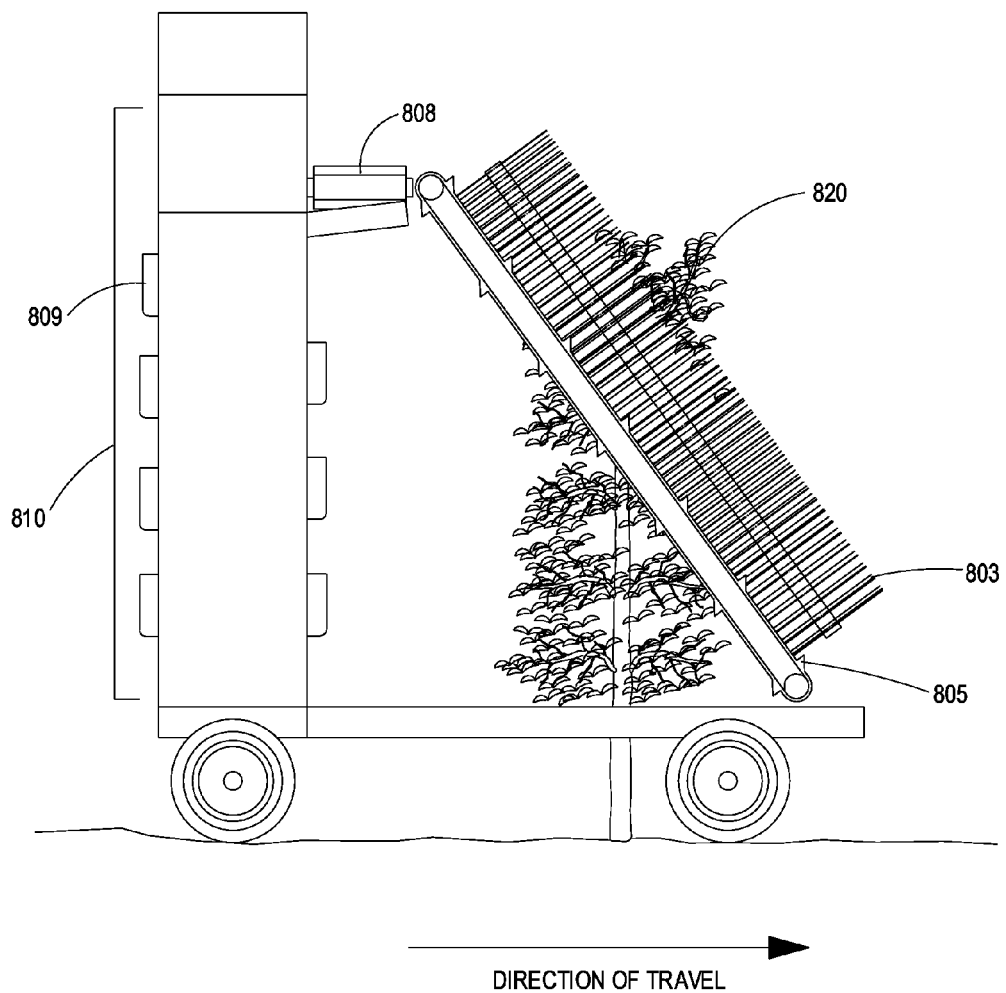
FIG. 11 shows a side view of the exemplary dual-sided rotary brush harvester of FIG. 8.

The one or more collection receptacles (e.g., agricultural bins) may be mounted on an apparatus (e.g., an elevator) capable of changing the position of a plurality of receptacles as the receptacles are filled with produce. As an example and without limiting the invention, the rotary brush harvester 800 shown in FIGS. 8-11 includes a bin elevator 810 having a plurality of bins 809 attached thereto on a track installed on the back left side of the harvester 800 (in other embodiments, the bin elevator may be installed in other locations on the harvester, e.g., on the right side of the harvester, or on both sides of the harvester). The bin elevator may have an inverted U or horse shoe-shaped track on which bins are mounted, and the bins may be moved along the track into position below a roller conveyor or an angled conveyor. For example and without limiting the invention, FIGS. 8-9 and 11 show a bin elevator 810 that may be operable to reposition bins 809 such that an empty bin is moved into a position at an end of the roller conveyor 808, where the empty bin can catch produce 821 coming off of the roller conveyor 808. As a bin in position to collect produce from the roller conveyor becomes full or substantially full, the bin elevator can change the position of the bins such that the full bin is replaced with an empty bin. In other non-limiting embodiments of the present invention, rotary harvesters may omit roller conveyors, and instead produce may be deposited in the bins directly from conveyors.

The bin elevator may be driven by a motor, which may be a separate motor or it may be connected to a motor driving the rotary brush harvester, the conveyor(s), or means for driving the rotary brush harvester along a row of trees. The operation of the bin elevator may be automated so that when a bin is substantially full, a sensor (not shown, and as described above) detects that the bin is substantially full and the bin elevator 807 replaces the substantially full bin with an empty bin. In other non-limiting embodiments, the bins may be switched by a human operator of the harvester, as described above.

The rotary brush harvester may be passively mobile or it may be self-propelled. In embodiments, where the harvester is self-propelled, the harvester may include an engine, transmission, drive train, etc. (not illustrated) that drives the wheels and tires. For instance, and without limitation, the harvester may be equipped with a diesel or gasoline internal combustion engine (not illustrated). Additionally, the harvester may include an operator's seat and controls (not illustrated) for operating and driving the vehicle. In such embodiments, the operator's seat and control may be located on a platform (not illustrated) above the tunnel. In other non-limiting embodiments, the chassis may be wider to accommodate the operator's seat and controls on one of the lateral sides of the harvester. In further non-limiting embodiments, the chassis may be longer to accommodate the operator's seat and controls at the front of the harvester on one side thereof. It is to be appreciated that other placements of the operator's seat and controls may be implemented. In embodiments where the harvester is passively mobile, it may have a one or more trailer hitches for attaching the harvester to a towing vehicle.

In other non-limiting embodiments, the two-sided harvester may have angled harvesting brushes mounted on both sides of a tunnel that may each be paired with a conveyor having a slide that is substantially parallel thereto. For example and without limiting the invention, the conveyors 804 and 805 in FIGS. 8-9 may include a parallel slide that catches the produce 821 coming off of the brushes 804 and 805. In some non-limiting embodiments, each slide may have a wedge shape such that one side runs about parallel to the harvesting brush and the opposite side runs horizontally along the chassis. The slides may also each have a lateral slant or curvature relative to the horizontal that slows the produce as it rolls down the slide. For example and without limiting the invention, the slides may each provide a surface that is laterally slanted in a range of about 30° to about 60° (e.g., about 45°, or any value therein). Bins or trays may be positioned at the base of each slide, e.g., near the bottom of the chassis for collecting the produce as it leaves the slide. Each conveyor may have texturing and/or decelerating elements to prevent the produce from traveling too quickly down the slide. For example and without limiting the invention, the slides may have bumps thereon, and/or decelerating elements suspended over the slide, such as fingers, brushes, gates, etc. In such embodiments, the slides may each deposit produce on a conveyor paired therewith located in the base of the chassis and along a bottom of the slide. The conveyors may move the produce to bins that may be located at the front or back of the harvester. In such embodiments, the conveyor may include an about horizontal motorized conveyor (e.g., a belt conveyor or a roller conveyor). Without limiting the invention, the bins in such embodiments may be mounted on bin elevators located at the front or back of the harvester at the end of each conveyor, and having a U-shaped track for the movement of the bins. The conveyors may deposit produce in bins located at an end of the conveyor (e.g., in a position near the base of the chassis), and when the bin is full or substantially full, the bin elevators may replace the full bin with an empty bin.

In some embodiments of the invention, the rotary brush harvester may be a row harvester having rotating brushes mounted on both lateral sides of the harvester, such that it may harvest produce from two adjacent rows trees or bushes (e.g., espaliered or trellised trees or bushes) at one time as the harvester passes between the two adjacent rows. One or more angled rotating harvesting brushes may be mounted on both sides of the harvester. In some examples, without limitation, the rotating brushes may each have a pitch angle in a range from about 20° to about 70° (e.g., about 30° to about 60°, about 40° to about 50°, about 45°, or any value or range of values therein), and they may have about the same pitch angle. The one or more rotating brushes on each side of the harvester may be paired with a conveyor parallel thereto on each side of the harvester, or the harvester may have one or more centrally located conveyor(s) that receives produce from brushes on both sides of the harvester. The conveyor(s) may be proximate and medial to the rotating brush. For example, and without limitation, the conveyor(s) may be about parallel to the corresponding brush(es) and at a distance therefrom of about 1 foot or less. Without limiting the invention, the conveyor(s) may also be just below (e.g., about 1 to 6 inches) the axis of the corresponding brush(es) in the vertical dimension and medially staggered from the brush(es) (e.g., such that medial edge of the brush is aligned with the lateral edge of the conveyor).

As an example and without limiting the invention, FIGS. 12-13 illustrate a rotary brush harvester 1200 having two rotating brushes 1201 and 1202 on either side of a chassis 1220. Each of the rotating brushes 1201 and 1202 may have a pitch angle of about 45° and may be parallel to a central conveyor 1203. The conveyor 1203 may be in close proximity to the corresponding brushes 1201 and 1202, which may deposit produce 1212 thereon. The conveyor(s) may be a belt conveyor having cleats or other structures for catching produce that may be deposited thereon by rotating harvesting brushes, or the conveyors may include a slide and decelerating elements. The conveyor(s) may also have a retaining wall at its base for preventing the produce from falling off of the harvester.

The rotary brush harvester may include a roller conveyor positioned at the top end of the central conveyor. In some non-limiting embodiments, there may be two roller conveyors (e.g., embodiments in which the harvester includes two paired angled conveyors). The roller conveyor may have rollers that are spaced apart to allow for the removal of debris from harvested produce that may be deposited thereon, as described above. The roller conveyor may deliver harvested produce into collection receptacles for the harvested produce. As an example and without limiting the invention, FIGS.

12-13 show a rotary brush harvester 1200 having a roller conveyor 1204 that may receive produce 1212 from central belt conveyor 1203. The roller conveyor 1204 may deposit the produce 1212 in bin 1205. In some examples, and without limitation, the roller conveyor may be motorized such that the rollers are propelled by the motor and move the produce toward collection receptacles (e.g., agricultural bins). In some non-limiting examples, the roller conveyor may be passive. The roller conveyor may include retaining walls on its lateral sides to prevent the produce from rolling off of the roller conveyor. It is to be appreciated that in some embodiments of the present invention, rotary brush harvesters can omit roller conveyors and instead deposit harvested produce directly into bins.

The rotary brush harvester may also have additional spill conveyors on each side of the harvester that are below the rotating brushes and/or the angled conveyor(s). In some examples, and without limitation, these additional spill conveyors may run horizontally and be located at the level of the lower ends of the angled conveyor(s). For example and without limiting the invention, spill conveyors (not illustrated) may be included in the rotary brush harvester 1200 shown in FIGS. 12-13, one below rotating brush 1201 and another below rotating brush 1202, such that they are horizontal and located in the base of the chassis 1220 below the lower end of conveyor 1203. In some examples, without limitation, spill conveyors may be provided beneath the brushes 1201 and 1202, either horizontally or parallel to the brushes. These spill conveyors may catch harvested produce that falls from the rotating brushes and does not make it onto the angled conveyor(s). The spill conveyors may route the harvested produce that they catch to the lower ends of the angled conveyor(s), such that the produce caught by the spill conveyors is placed on the conveyor(s) to be conveyed to the roller conveyor or one or more collection receptacles.

The one or more collection receptacles (e.g., agricultural bins) may be mounted on an apparatus (e.g., an elevator) capable of changing the position of a plurality of receptacles as the receptacles are filled with produce. As an example and without limiting the invention, the rotary brush harvester 1200 shown in FIGS. 12-13 includes a bin elevator 1206 having a plurality of bins 1205 attached thereto on a track installed on the back of the harvester 1200. The bin elevator may have an inverted U or horse shoe-shaped track on which bins are mounted, and the bins may be moved along the track into position below a roller conveyor or an angled conveyor. For example and without limiting the invention, FIGS. 12-13 show a bin elevator 1206 that may be operable to reposition bins 1205 such that an empty bin is moved into a position at an end of the roller conveyor 1204, where the empty bin can catch produce 1212 coming off of the roller conveyor 1204. As a bin in position to collect produce from the roller conveyor becomes full or substantially full, the bin elevator can change the position of the bins such that the full bin is replaced with an empty bin. In other non-limiting embodiments of the present invention, rotary harvesters may omit roller conveyors, and instead produce may be deposited in the bins directly from conveyors.

The bin elevator may be driven by a motor, which may be a separate motor or it may be connected to a motor driving the rotary brush harvester, the conveyor(s), or means for driving the rotary brush harvester along a row of trees. The operation of the bin elevator may be automated so that when a bin is substantially full, a sensor (not shown, and as described above) detects that the bin is substantially full and the bin elevator replaces the substantially full bin with an empty bin. In other non-limiting embodiments, the bins may be switched by a human operator of the harvester, as described above.

The rotary brush harvester (e.g., a dual-sided harvester as shown in FIGS. 12-13) may be passively mobile or it may be self-propelled. In embodiments, where the harvester is self-propelled, the harvester may include an engine, transmission, drive train, etc. (no examples shown) that drives the wheels and tires. As a non-limiting example, the harvester 1200 in FIG. 12 may be equipped with a diesel or gasoline internal combustion engine (no examples shown) for driving wheels and tires 1207. Additionally, the harvester may include an operator's seat and controls (no examples shown) for operating and driving the vehicle. In such embodiments, the operator's seat and control may be located on a platform (no examples shown) above the angled conveyor(s). In other non-limiting embodiments, the chassis may be wider to accommodate the operator's seat and controls on one of the lateral sides of the harvester. In further non-limiting embodiments, the chassis may be longer to accommodate the operator's seat and controls at the front of the harvester on one side thereof. It is to be appreciated that other placements of the operator's seat and controls may be implemented, as well. In embodiments where the harvester is passively mobile, it may have a one or more trailer hitches for attaching the harvester to a towing vehicle.

In other non-limiting embodiments, the two-sided harvester may have angled rotating brushes mounted on both lateral sides of the harvester that may each be paired with conveyor having a slide that is substantially parallel thereto. For example and without limiting the invention, the conveyor 1203 in FIG. 12 may include a parallel slide that catches the fruit 1212 coming off of the brushes 1202 and 1203. In some embodiments and without limiting the invention, each slide may have a wedge shape such that one side runs about parallel to the harvesting brush and the opposite side runs horizontally along the chassis. In such embodiments, the slides may have a lateral slant or curvature relative to the horizontal that slows the produce as it rolls down the slide. For example and without limiting the invention, the slides may each provide a surface slanted in a range of about 30° to about 60° (e.g., about 45°, or any value therein). Each conveyor may have texturing and/or decelerating elements to prevent the produce from traveling too quickly down the slide. For example and without limiting the invention, the slides may have bumps thereon, and/or decelerating elements suspended over the slide, such as fingers, brushes, gates, etc. Bins or trays may be positioned at the base of each slide, e.g., near the bottom of the chassis for collecting the produce as it leaves the slide. In some non-limiting embodiments, a single row or set of bins or trays may receive produce from both slides. In other non-limiting embodiments, the slides may each deposit produce on a single conveyor located in the base of the chassis and along a bottom of the slide. The conveyor may move the produce to bins that may be located at the front or back of the harvester. In such embodiments, the conveyor may include an about horizontal motorized conveyor (e.g., a belt conveyor or a roller conveyor). Without limiting the invention, the bins in such embodiments may be mounted on a bin elevator that is similar to the bin elevator 1206 shown in FIG. 12, and located at the front or back of the harvester and having a U-shaped track for the movement of the bins. The conveyors may deposit produce in bins located at an end of the conveyor (e.g., in a position near the base of the chassis), and when the bin is full or substantially full, the bin elevators may replace the full bin with an empty bin.

In other non-limiting embodiments, the rotating brushes may be mounted on either side of a mobile trailer or a truck bed. The brushes may each be paired with a parallel conveyor having a slide (e.g., a slide that runs the length of the brush) that leads into the bed of the trailer or the truck bed, such that the produce may be deposited by the brush on to the corresponding slide and may then roll down the slide into the bed or into one or more bins present in the bed.

CONCLUSION/SUMMARY

The present invention concerns rotary brush harvesters that catch produce as they are removed from a tree or bush by the harvester. The rotating brushes are actively driven and may have flexible radiating members (e.g., bristles) for removing produce from trees or bushes. The rotary harvesters described herein may prevent produce from being damaged by falling substantial distances when removed from their trees or bushes. The prevention also relates to methods of using such harvesters. The rotary brush harvesters and methods described herein beneficially prevent bruising and wounding of harvested produce and allow for selective harvesting of ripe crops.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A harvesting apparatus for removing produce from espaliered trees, comprising:
   a. a mobile chassis having a tunnel;
   b. a first harvesting brush and a second harvesting brush, each harvesting brush having a substantially elongate cylindrical shape, a rotating central axial member, and flexible radiating members attached to and extending from said central axial member, wherein said first and second harvesting brushes are mounted on said chassis about parallel to each other on opposite lateral sides of said chassis and on opposite lateral sides of said tunnel, and are operable to engage opposite sides of a row of trees;
   c. at least one motor operable to actively rotate each of said harvesting brushes at variable rotational speeds;
   d. a first conveyor and a second conveyor, said first conveyor about parallel to said central axial member of said first harvesting brush and said second conveyor about parallel to said central axial member of said second harvesting brush; and
   e. at least one collection receptacle near an end of at least one of said first and second conveyors for receiving harvested produce.

2. The harvesting apparatus of claim 1, wherein a distance between said first and said second harvesting brushes is adjustable.

3. The harvesting apparatus of claim 2, wherein a distance between said first and second harvesting brushes may be adjusted by changing the lateral positions of at least one of said first and second harvesting brushes relative to said chassis.

4. The harvesting apparatus of claim 1, wherein said first and second harvesting brushes each have a medial side that protrudes into said tunnel, and said at least one motor is operable to rotate said medial side of each of said first and second harvesting brushes upward into said trees passing through said tunnel.

5. The harvesting apparatus of claim 1, wherein said central axial member of each of said first and said second harvesting brushes has a downward pitch angle of between about 20° and about 70° relative to the ground.

6. The harvesting apparatus of claim 1, wherein said flexible radiating members of said first and said second harvesting brushes comprise flexible fibers.

7. The harvesting apparatus of claim 1, wherein a distance between said first harvesting brush and said first conveyor is less than about 3 feet, and a distance between said second harvesting brush and said second conveyor is less than about 3 feet.

8. The harvesting apparatus of claim 1, wherein a distance between a lateral side of said first harvesting brush and said first conveyor is less than about 1 foot, and a distance between a lateral side of said second harvesting brush and said second conveyor is less than about 1 foot.

9. A harvesting apparatus for removing produce from trees, comprising:
   a. a chassis operable to travel in a horizontal direction and having a tunnel therethrough;
   b. a first rotating brush and a second rotating brush each having a substantially elongate cylindrical shape for harvesting said produce and a downward pitch angle of between about 20° and about 70° relative to the ground, said first and second rotating brushes mounted on opposite lateral sides of said chassis and on opposite lateral sides of said tunnel;
   c. a motor operable to actively rotate said first brush at variable rotational speeds;
   d. a first conveyor about parallel to said first brush; and
   e. a first receptacle for receiving harvested produce from said first conveyor.

10. The harvesting apparatus of claim 9, wherein said motor is operable to rotate a side of said first brush upward into said trees, and draw produce away from said trees and project said produce toward said first conveyor.

11. The harvesting apparatus of claim 9, wherein a distance between a lateral side of said first brush and said first conveyor is about less than about one foot.

12. The harvesting apparatus of claim 9, further comprising a second conveyor about parallel to said second brush.

13. The harvesting apparatus of claim 9, wherein said harvesting apparatus is a row harvester with said tunnel configured to receive a row of espaliered trees therethrough, and said first and second rotating brushes are operable to engage opposite sides of said row of espaliered trees.

14. The harvesting apparatus of claim 9, wherein said first and second rotating brushes each comprise a rotating central axial member and a plurality of flexible radiating members attached to and extending from said central axial member.

15. A method of harvesting produce from a row of espaliered trees, comprising:
   a. moving a harvesting apparatus in a horizontal direction along said row of trees, said harvesting apparatus having a tunnel through which said row of trees passes, said harvesting apparatus having first and second harvesting brushes on opposite lateral sides of said harvesting apparatus and on opposite lateral sides of said tunnel, wherein said first and second harvesting brushes engage opposite sides of said row of trees;

b. actively rotating said first and second harvesting brushes to remove produce from said trees, wherein said first and second harvesting brushes have flexible radiating members removing said produce as the first and second harvesting brushes rotate, said first harvesting brush projects said produce towards a first conveyor running about parallel to a rotational axis of said first harvesting brush, and said second harvesting brush projects said produce towards a second conveyor running about parallel to a rotational axis of said second harvesting brush;

c. catching said produce on said first and second conveyors;

d. transporting said produce upwards along said first and second conveyors; and e. depositing said produce from said first and second conveyors into at least one receptacle.

16. The method of claim 15, said first and second harvesting brushes each having a generally elongate cylindrical shape and said rotational axes of said harvesting brushes are at an angle of between about 20° and about 70° relative to the ground.

17. The method of claim 15, wherein a medial side of each of said first and second harvesting brushes is inserted into said row of trees and is rotated upward into said row of trees.

18. The method of claim 15, wherein said first and second harvesting brushes remove ripe produce from said trees and leave unripe produce attached to said trees.

19. The method of claim 15, further comprising the step of adjusting a position of at least one of said first and second harvesting brushes with respect to said trees.

20. A harvesting apparatus for removing produce from espaliered trees, comprising:

a. a mobile chassis having a tunnel therein for passing said trees;

b. a first harvesting brush and a second harvesting brush, each harvesting brush having a substantially elongate cylindrical shape and flexible radiating members, wherein said first and second harvesting brushes are mounted on said chassis about parallel to each other and on opposite sides of said tunnel, said first and second harvesting brushes each having a downward pitch angle of about 20° to about 70° relative to the ground;

c. at least one motor operable to actively rotate said first and second harvesting brushes, wherein said first and second harvesting brushes each have a medial side that protrudes into said tunnel and said at least one motor is operable to rotate said medial sides of said first and second harvesting brushes upward into said trees passing through said tunnel;

d. a first conveyor and a second conveyor, said first conveyor being about parallel to said first harvesting brush and said second conveyor about parallel to said second harvesting brush, wherein a distance between a lateral side of said first harvesting brush and said first conveyor is less than about 1 foot and said first conveyor is at or below a longitudinal axis of said first harvesting brush in a vertical dimension, and a distance between a lateral side of said second harvesting brush and said second conveyor is less than about 1 foot and said second conveyor is at or below a longitudinal axis of said second harvesting brush in a vertical dimension;

e. a third conveyor operable to move said produce from said second conveyor across said chassis; and f. at least one collection receptacle near an end of said first conveyor for receiving said produce from said first conveyor and said second conveyor.

21. The harvesting apparatus of claim 1, wherein said at least one collection receptacle is proximate to a top end of said first brush.

22. The harvesting apparatus of claim 9, wherein said first receptacle is proximate to a top end of said first brush.

23. The harvesting apparatus of claim 1, wherein said first harvesting brush is operable to remove produce from said row of trees and deposit said produce directly on said first conveyor and said second harvesting brush is operable to remove said produce from said row of trees and deposit said produce directly on said second conveyor.

24. The harvesting apparatus of claim 1, further comprising a roller conveyor between said first conveyor and said at least one collection receptacle, said roller conveyor for removing debris from produce harvested from said row of trees.

25. The harvesting apparatus of claim 13, further comprising a second conveyor about parallel to said second brush, wherein said first brush is operable to remove produce from said row of espaliered trees and deposit said produce directly on said first conveyor, and wherein said second brush is operable to remove said produce from said row of espaliered trees and deposit said produce directly on said second conveyor.

26. The harvesting apparatus of claim 14, wherein said first conveyor has a direction of transport about parallel to said rotating central axial member of said first brush, and wherein said second conveyor has a direction of transport about parallel to said rotating central axial member of said second brush.

27. The method of claim 15, wherein said produce is deposited by said first harvesting brush directly on said first conveyor and said produce is deposited by said second harvesting brush directly on said second conveyor.

28. The harvesting apparatus of claim 15, wherein said row of trees is a row of espaliered stone fruit trees.

29. The harvesting apparatus of claim 20, wherein said first and second harvesting brushes are mounted on said opposite lateral sides of said chassis and on opposite lateral sides of said tunnel.

30. The harvesting apparatus of claim 20, wherein said third conveyor is operable to move said produce from a top end of said second conveyor to a top end of said first conveyor.

* * * * *

UNITED STATES PATENT AND TRADEMARK OFFICE
CERTIFICATE OF CORRECTION

| | | |
|---|---|---|
| PATENT NO. | : 8,635,845 B1 | |
| APPLICATION NO. | : 13/786194 | |
| DATED | : January 28, 2014 | |
| INVENTOR(S) | : Ryan S. Palm | |

It is certified that error appears in the above-identified patent and that said Letters Patent is hereby corrected as shown below:

IN THE CLAIMS

Claim 11, Column 26, line 45 of the issued patent: change "about less than about one foot" to --less than about one foot--.

Claim 29, Column 28, lines 48-49 of the issued patent: change "said opposite lateral sides of said chassis" to --opposite lateral sides of said chassis--.

Signed and Sealed this
Twenty-ninth Day of April, 2014

Michelle K. Lee
*Deputy Director of the United States Patent and Trademark Office*